(12) United States Patent
Yue et al.

(10) Patent No.: US 12,443,430 B2
(45) Date of Patent: Oct. 14, 2025

(54) DATA PROCESSING METHOD BASED ON CONTAINER ENGINE AND RELATED DEVICE

(71) Applicant: Tencent Cloud Computing (Beijing) Co., Ltd., Beijing (CN)

(72) Inventors: Yuan Yue, Beijing (CN); Luping Liu, Beijing (CN); Zhiqiang Dong, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 254 days.

(21) Appl. No.: 18/302,100

(22) Filed: Apr. 18, 2023

(65) Prior Publication Data

US 2023/0259386 A1 Aug. 17, 2023

Related U.S. Application Data

(63) Continuation of application No. PCT/CN2021/107698, filed on Jul. 21, 2021.

(30) Foreign Application Priority Data

Mar. 17, 2021 (CN) .......................... 202110286214.X

(51) Int. Cl.
 *H04L 9/40* (2022.01)
 *G06F 3/04842* (2022.01)
 (Continued)

(52) U.S. Cl.
 CPC .......... *G06F 9/45558* (2013.01); *H04L 63/20* (2013.01); *G06F 2009/45587* (2013.01); *G06F 2009/45595* (2013.01)

(58) Field of Classification Search
 CPC ....... G06F 9/45558; G06F 2009/45587; G06F 2009/45595; G06F 2221/2141; G06F 21/53; G06F 21/57; H04L 63/20
 (Continued)

(56) References Cited

U.S. PATENT DOCUMENTS

| | | | |
|---|---|---|---|
| 10,333,981 B2 | 6/2019 | Lee et al. | |
| 2007/0199044 A1* | 8/2007 | Hughes | H04L 63/20 726/1 |

(Continued)

FOREIGN PATENT DOCUMENTS

| | | | | |
|---|---|---|---|---|
| CN | 101398871 A | * | 4/2009 | ......... H04N 21/2543 |
| CN | 106469083 A | | 3/2017 | |

(Continued)

OTHER PUBLICATIONS

The World Intellectual Property Organization (WIPO) International Search Report for PCT/CN2021/107698 Dec. 14, 2021 12 Pages (including translation).

*Primary Examiner* — Emmanuel L Moise
*Assistant Examiner* — Berhanu Shitayewoldetadik
(74) *Attorney, Agent, or Firm* — Anova Law Group, PLLC

(57) ABSTRACT

A data processing method based on a container engine and a related device are provided. The data processing method includes: acquiring, in response to a creation request for an isolation container, creation dependency resource information of the isolation container; performing validity verification on the creation dependency resource information based on a valid policy file of a container engine corresponding to the isolation container, to obtain a validity verification result of the isolation container; and creating the isolation container when the validity verification result is a valid result.

17 Claims, 9 Drawing Sheets

(51) Int. Cl.
*G06F 9/455* (2018.01)
*G06F 16/9535* (2019.01)
*G06F 16/9538* (2019.01)
*H04L 15/16* (2006.01)

(58) Field of Classification Search
USPC .............................................. 726/1
See application file for complete search history.

(56) References Cited

U.S. PATENT DOCUMENTS

| | | | |
|---|---|---|---|
| 2016/0366183 A1* | 12/2016 | Smith | H04L 63/06 |
| 2017/0054759 A1* | 2/2017 | Lee | G06F 21/50 |
| 2018/0137296 A1* | 5/2018 | Cahana | G06F 21/629 |
| 2018/0293394 A1* | 10/2018 | Gunda | G06F 9/45558 |
| 2021/0144555 A1* | 5/2021 | Kim | H04L 63/1458 |
| 2021/0165781 A1* | 6/2021 | Wang | G06F 16/2379 |
| 2021/0281578 A1* | 9/2021 | Olson | H04L 63/20 |

FOREIGN PATENT DOCUMENTS

| | | | | |
|---|---|---|---|---|
| CN | 107533470 A * | 1/2018 | | G06F 9/445 |
| CN | 107643940 A | 1/2018 | | |
| CN | 109214148 A | 1/2019 | | |
| CN | 111562970 A | 8/2020 | | |
| CN | 111857967 A | 10/2020 | | |
| CN | 112231061 A | 1/2021 | | |
| WO | WO-2005008943 A2 * | 1/2005 | | H04L 67/1001 |
| WO | WO-2020026021 A1 * | 2/2020 | | G06Q 10/107 |

\* cited by examiner

DATA PROCESSING METHOD BASED ON CONTAINER ENGINE AND RELATED DEVICE

CROSS-REFERENCES TO RELATED APPLICATIONS

This application is a continuation application of PCT Patent Application No. PCT/CN2021/107698, entitled "DOCKER-BASED DATA PROCESSING METHOD AND RELATED DEVICE" and filed on Jul. 21, 2021, which claims priority to Chinese Patent Application No. 202110286214.X, filed on Mar. 17, 2021 and entitled "DATA PROCESSING METHOD BASED ON CONTAINER ENGINE AND RELATED DEVICE", the entire contents of both of which are incorporated herein by reference.

FIELD OF THE TECHNOLOGY

The present disclosure relates to the field of cloud technologies, and in particular, to a data processing method based on a container engine and a related device.

BACKGROUND OF THE DISCLOSURE

A Docker (an application container engine) is an open source software container platform, and supports developers to package a developed application and a dependency package of the application into a portable container, and then publish the portable container to any popular Linux (an operating system kernel) machine. The portable container also supports virtualization. The dependency package of the application generally includes some library files, such as a dynamic library file and a static library file. The Docker technology can help enterprises scale services quickly and horizontally, thus reaching an ability to deploy services flexibly.

With development and popularization of the Docker, a user also faces more and more security risks when using the Docker. For example, the user runs a suspicious container by using the Docker, resulting in an attack on a client environment, and resulting in loss such as privacy disclosure and file loss.

SUMMARY

Embodiments of the present disclosure provide a data processing method based on a container engine and a related device.

An aspect of the embodiments of the present disclosure provides a data processing method based on a container engine, including: acquiring, in response to a creation request for an isolation container, creation dependency resource information of the isolation container; performing validity verification on the creation dependency resource information based on a valid policy file of a container engine corresponding to the isolation container, to obtain a validity verification result of the isolation container; and creating the isolation container when the validity verification result is a valid result.

An aspect of the embodiments of the present disclosure provides a data processing apparatus based on a container engine, including: a monitoring and acquiring module, configured to acquire, in response to a creation request for an isolation container, creation dependency resource information of the isolation container; a validity verification module, configured to perform validity verification on the creation dependency resource information based on a valid policy file of a container engine corresponding to the isolation container, to obtain a validity verification result of the isolation container; and a validity processing module, configured to create the isolation container when the validity verification result is a valid result.

An aspect of the embodiments of the present disclosure provides a computer device, including: a processor and a memory, the processor being connected to the memory, where the memory is configured to store a computer program, and the computer program is executed by the processor, so that the computer device performs the data processing method based on a container engine provided in the embodiment of the present disclosure.

An aspect of the embodiments of the present disclosure provides a non-transitory computer readable storage medium. The computer readable storage medium stores a computer program. The computer program is adapted to be loaded and executed by a processor, so that a computer device having the processor performs the data processing method based on a container engine provided in the embodiment of the present disclosure.

DESCRIPTION OF EMBODIMENTS

Figure 1:
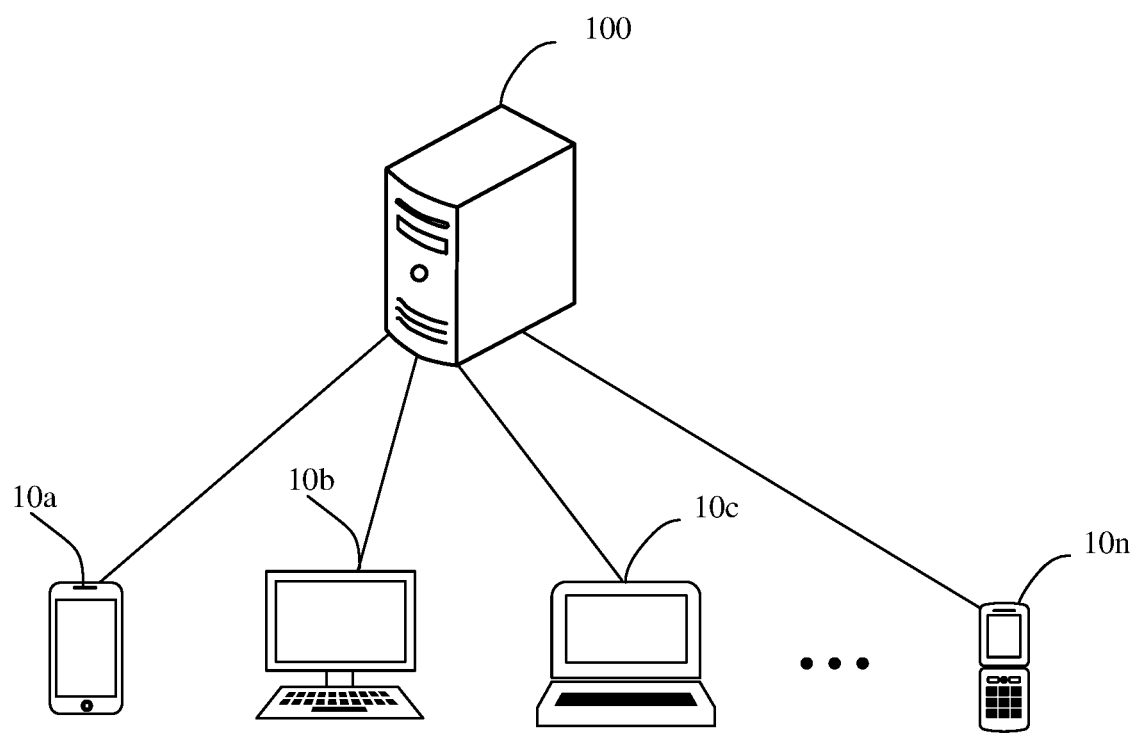
FIG. 1 is a network architecture diagram according to an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

A cloud technology is a general term of a network technology, an information technology, an integration technology, a management platform technology, and an application technology that are applied based on a cloud computing business model. The cloud technology may form a resource pool and be used as required, and is flexible and convenient. The cloud computing technology will become an important support. A background service of a technology network system requires a large amount of computing and storage resources, such as a video website, a picture website, and more portals. With rapid development and application of the Internet industry, each item may have its own identification mark in the future. The identification mark needs to be transmitted to a background system for logical processing. Data at different levels will be processed separately. All types of industry data need to be supported by a powerful system, which can only be implemented through cloud computing.

Cloud computing refers to a mode of delivery and use of an IT infrastructure, and a required resource is obtained through a network in an on-demand and easy-to-scale manner. Generalized cloud computing refers to a mode of service delivery and use, and a required service is obtained through a network in an on-demand and easy-to-scale manner. This service may be related to IT, software, the Internet, or other services. Cloud computing is a product of development and convergence of computers and network technologies such as grid computing, distributed computing, parallel computing, utility computing, network storage, virtualization, load balancing, and the like.

With the development of the Internet, real-time data streams, and connection devices, and the development of demands for search services, social networks, mobile commerce, and open collaboration, cloud computing rapidly develops. Unlike the previous parallel distributed computing, cloud computing can revolutionize the entire Internet mode and enterprise management mode.

The solutions provided in the embodiments of the present disclosure belong to cloud security subordinate to the field of cloud technology.

Cloud security is a general term of security software, hardware, users, organizations, and security cloud platforms that are applied based on a cloud computing business model. Cloud security integrates new technologies and concepts such as parallel processing, grid computing, and unknown virus behavior judgment, obtains latest information of Trojans and malicious programs in the Internet through monitoring of abnormal software behavior in the network by using a large quantity of mesh clients, transmits the latest information to a server for automatic analysis and processing, and then distributes the solutions of virus and Trojans to each client.

Main research directions of cloud security include: 1. Cloud computing security mainly focuses on how to ensure security of cloud itself and applications on the cloud, including cloud computer system security, user data security storage and isolation, user access authentication, information transmission security, network attack protection, and compliance audit. 2. Cloud-based security infrastructure focuses on how to use cloud computing to create and integrate security infrastructure resources and optimize security protection mechanisms, including construction of super-scale security events and information collection and processing platforms by using cloud computing technologies to collect and correlatively analyze massive information and improve network-wide security event control and risk control capabilities. 3. Cloud security services mainly study various security services, such as antivirus services, provided to users based on cloud computing platforms.

FIG. 1 is a network architecture diagram according to an embodiment of the present disclosure. As shown in FIG. 1, the network architecture may include a security server 100 and a terminal cluster. The terminal cluster may include a plurality of terminals. As shown in FIG. 1, the terminal cluster may specifically include a terminal 10a, a terminal 10b, a terminal 10c, . . . , and a terminal 10n. As shown in FIG. 1, the terminal 10a, the terminal 10b, the terminal 10c, . . . , and the terminal 10n may separately establish a network connection to the security server 100, so that each terminal can exchange data with the security server 100 by using the network connection, and each terminal can receive security data from the security server 100.

As shown in FIG. 1, each terminal may be integrated with a target application. When the target application runs on each terminal, each terminal may generate an isolation container by using the target application. The target application may be a container engine that can create and use an isolation container. The security server 100 may separately deliver the security data to each terminal. The security data may be a target policy file and a signature file associated with the target policy file. In some embodiments, the target policy file may be generated according to at least one of invalid user information, an invalid image list, invalid privileged field information, a sensitive mount directory path, or an image list to be verified. The signature file is obtained by the security server 100 by signing the target policy file by using a private key. Each terminal receives the security data transmitted by the security server 100, acquires a public key corresponding to the security server 100, and performs verification processing on the signature file by using the public key. If the verification succeeds, it may be determined that the security data is from the security server 100, and the terminal stores the target policy file as a valid policy file. After storing the valid policy file, each terminal may first perform validity verification on the isolation container by using the valid policy file before creating the isolation container by using the target application, and then determine, according to a validity verification result, whether to create the isolation container. It can be learned that in the present disclosure, before the isolation container is created, validity verification needs to be performed on the isolation container by using the valid policy file, and the isolation container can be created and started only after the verification succeeds, thereby avoiding start of a malicious container and reducing occurrence of a risk.

It may be understood that the method provided in this embodiment of the present application may be performed by a computer device, and the computer device includes but is not limited to a terminal or a security server. The security server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

It may be understood that the device (for example, the security server 100, the terminal 10a, the terminal 10b, the terminal 10c, . . . , and the terminal 10n) may be a node in a distributed system, the distributed system may be a blockchain system, and the blockchain system may be a distributed system formed by connecting the plurality of nodes in a form of network communication. A peer-to-peer (P2P) network may be formed between nodes, and a P2P protocol is an application layer protocol that runs on a Transmission Control Protocol (TCP). In the distributed system, any form of computer device, such as an electronic device such as a server or a terminal, may become a node in the blockchain system by joining the peer-to-peer network.

The terminal and the security server may be directly or indirectly connected in a wired or wireless communication manner, which is not limited in the present disclosure.

The terminal 10a, the terminal 10b, the terminal 10c, and the terminal 10n in FIG. 1 may include a smartphone, a tablet computer, a notebook computer, a palmtop computer, a smart box, a mobile internet device (MID), a point of sales (POS) machine, a wearable device (such as a smart watch or a smart band), and the like.

The following uses an example in which after receiving the target policy file of the security server 100, the terminal 10b performs validity verification before starting the container for description.

Figure 2A:
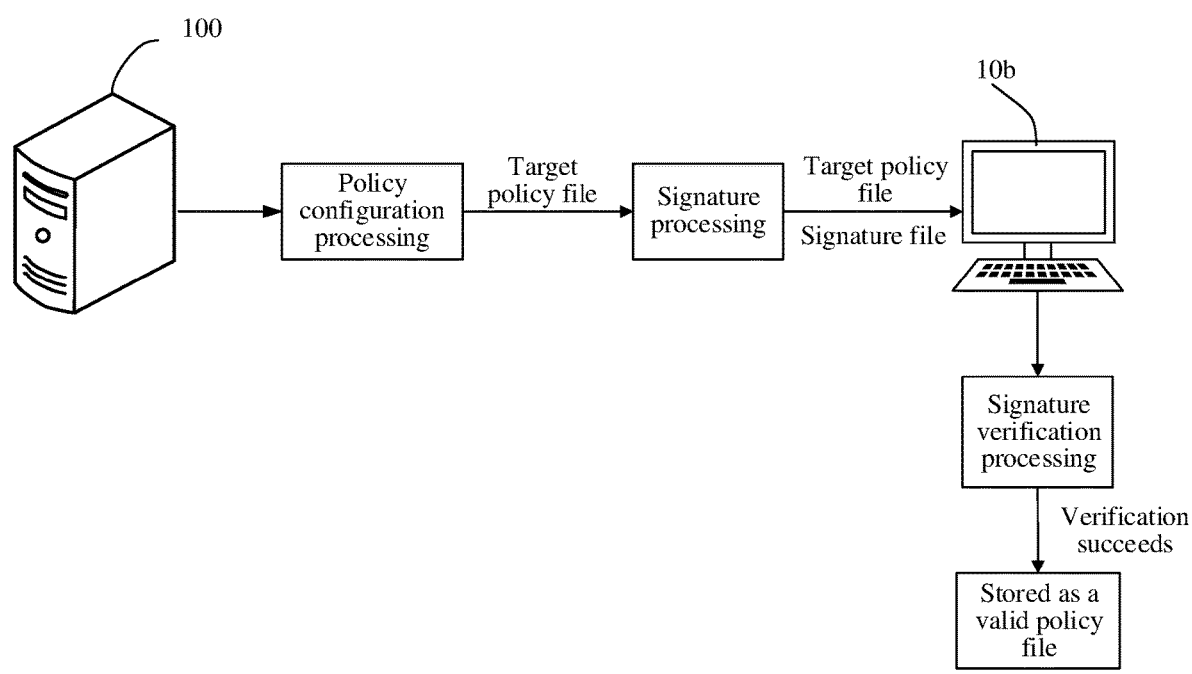
FIG. 2a and FIG. 2b are a schematic diagram of a data processing scenario based on a container engine according to an embodiment of the present disclosure.
Figure 2B:
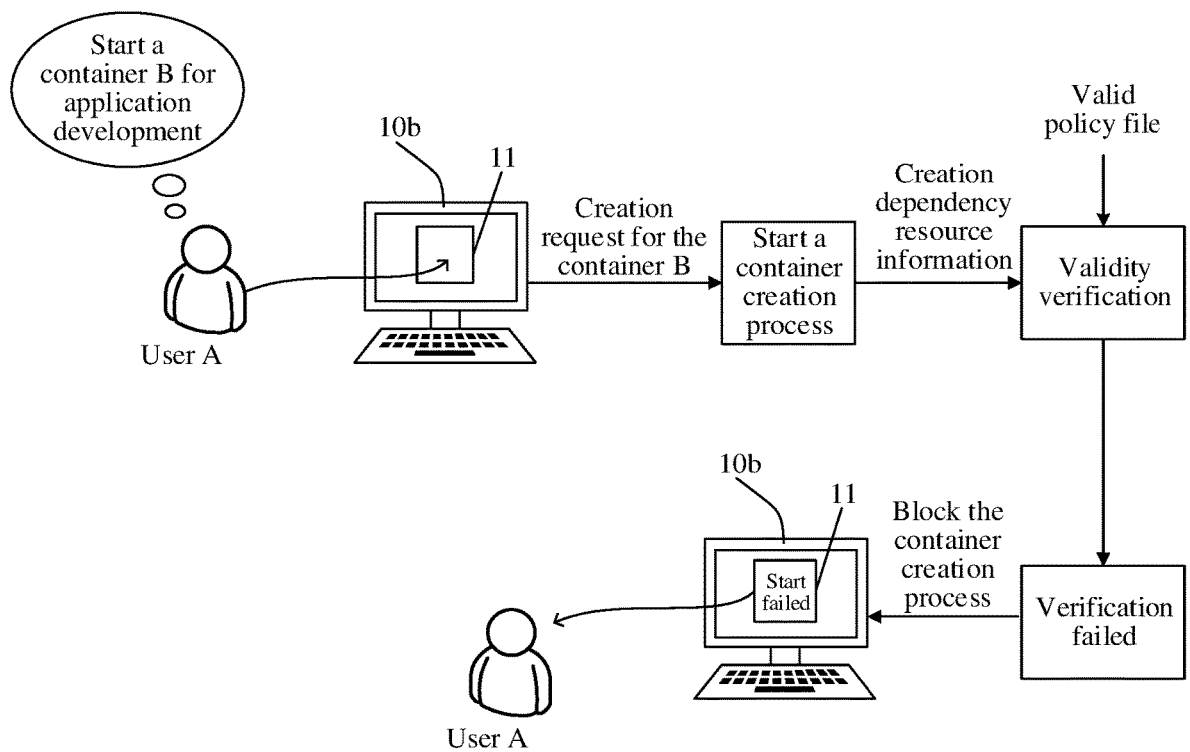

For ease of understanding, referring to FIG. 2a and FIG. 2b, FIG. 2a and FIG. 2b are a schematic diagram of a data processing scenario based on a container engine according to an embodiment of the present disclosure. As shown in FIG. 2a, the security server 100 may generate a target policy file through policy configuration processing, and then perform signature processing on the target policy file to obtain a signature file. Then, the security server 100 transmits the target policy file and the signature file to the terminal 10b together. The policy configuration processing may be: generating the target policy file according to a policy configuration rule and at least one of invalid user information, an invalid image list, invalid privileged field information, a sensitive mount directory path, or an image list to be verified. The policy configuration rule may be manually set by a user according to a requirement, which is not limited herein. The signature processing may be that the security server 100 signs the signature file (e.g., target policy file) by using an owned private key, to obtain the signature file. After receiving the signature file and the target policy file, the terminal 10b first needs to perform verification processing on the signature file, that is, perform signature verification on the signature file by using the public key of the security server 100. If the verification succeeds, it indicates that the received signature file and policy file are transmitted by the security server 100, and a source of the signature file and the policy file is reliable. Therefore, the terminal 10b can store the target policy file as a valid policy file.

After storing the valid policy file, the terminal 10b may first pause running of a container creation process for an isolation container in response to detecting that the container creation process is started, perform validity verification according to the valid policy file and creation dependency resource information, and continue to run the container creation process when the verification succeeds, so as to create the isolation container; and process the container creation process according to an invalid processing mechanism when the verification fails. As shown in FIG. 2b, a container engine client 11 is integrated on the terminal 10b, and a user A intends to start a container B by using the container engine client 11 to develop an application. The terminal 10b responds to an operation performed by the user A on the container engine client 11 to obtain a creation request for the container B, and then the terminal 10b generates a container creation process for the container B according to the creation request. As a common user of the container engine client 11, the user A may not know whether a container risk problem such as whether the container B is untrusted, carries a high-risk vulnerability, has a high permission, and is mounted with a high-risk directory of the terminal 10b, or may have an operation risk problem such as being unfamiliar with the container engine client 11 and using a high user permission to start the container B or using an incorrect password to start the container B. In this case, if the terminal 10b generates and runs the container B according to the container creation process, a security problem such as hacker intrusion may be encountered, which causes an attack on a running environment and causes loss to the user A. Therefore, when the terminal 10b monitors that the container creation process for the container B is started, the terminal 10b first pauses running of the container creation process, acquires the creation dependency resource information from the creation request, acquires the valid policy file stored locally as shown in FIG. 2a, and then performs validity verification on the container B according to the creation dependency resource information and the valid policy file. The creation dependency resource information may include user information, first image information, privileged field information, a loading directory path, second image information, and the like. For different types of creation dependency resource information, corresponding policies may be found in the valid policy file to perform validity verification. After all creation dependency resource information passes validity verification, the terminal 10b determines that the creation request for the container B is verified. If any piece of creation dependency resource information does not pass validity verification, the terminal 10b determines that verification fails. As shown in FIG. 2b, assuming that the container B is an untrusted container, after performing validity verification on the container B, the terminal 10b determines that verification fails. In this case, the terminal 10b blocks the container creation process, and then reminds the user A that the container creation process fails to start.

It may be learned from the foregoing description that, after obtaining the creation request for the container B, the terminal 10b monitors that the container creation process generated for the container B is started, acquires the creation dependency resource information from the creation request, performs validity verification on the container B according to the valid policy file and the creation dependency resource information, to obtain a validity verification result, and finally processes the container creation process according to the validity verification result. A specific implementation process may be as follows:

The terminal 10b includes a container engine daemon corresponding to the container engine client 11. The container engine daemon may interact with the container engine client 11, and manage start, running, and generation of the container. The terminal 10b transmits the creation request of the container B to the container engine daemon. When the container engine daemon obtains the creation request, the container creation process for the container B may be generated according to the creation request. The terminal 10b may monitor the container creation process and forward the creation request from the container engine daemon to a security policy agent component in response to detecting that the container creation process is started. The forwarding the creation request in response to detecting that the container creation process is started may be implemented by using the container engine daemon, or may be implemented by using the security policy agent component. Then, the terminal 10b may acquire the creation dependency resource information corresponding to the isolation container from the creation request by using the security policy agent component, then acquire the valid policy file by using the security policy agent component, and perform validity verification on the container B together with the creation dependency resource information to obtain the validity verification result. Then the terminal 10b transmits the validity verification result to the container engine daemon. In the container engine daemon, the terminal 10b processes the container creation process according to the validity verification result, and returns a processing result to the container engine client 11.

In some embodiments, the foregoing data processing method implemented by the security policy agent component may be implemented in the container engine daemon, and only a corresponding function module needs to be built into the container engine daemon.

Figure 3:
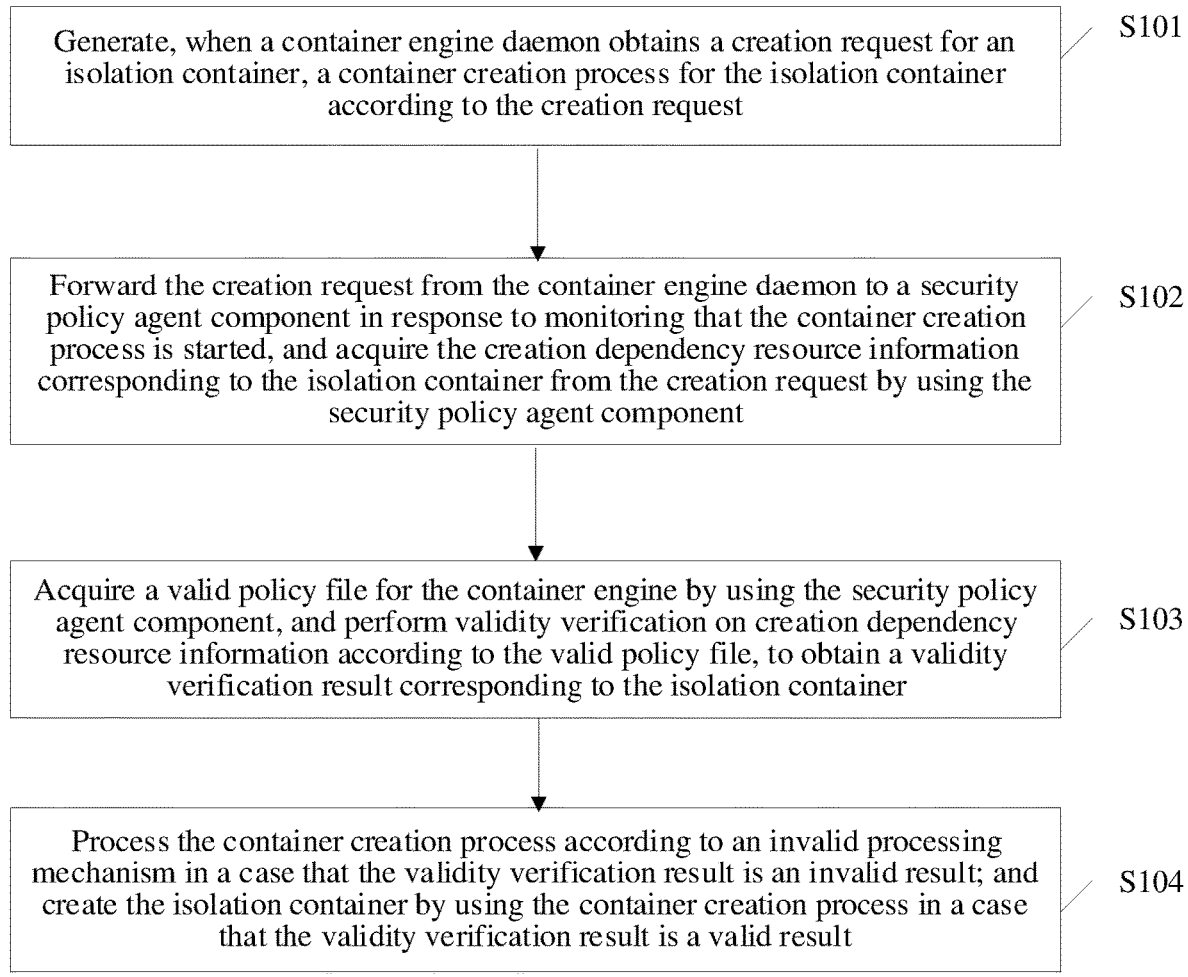
FIG. 3 is a schematic flowchart of a data processing method based on a container engine according to an embodiment of the present disclosure.

Further, referring to FIG. 3, FIG. 3 is a schematic flowchart of a data processing method based on a container engine according to an embodiment of the present disclosure. The method is performed by the computer device in FIG. 1, that is, it may be the security server 100 in FIG. 1, or may be the terminal cluster in FIG. 1 (also including the terminal 10a, the terminal 10b, the terminal 10c, and the terminal 10n). As shown in FIG. 3, the data processing process includes the following steps:

S101. The computer device generates, when a container engine daemon obtains a creation request for an isolation container, a container creation process for the isolation container according to the creation request.

That is, S101 is generating a container creation process according to the creation request when a container engine daemon obtains the creation request, the container creation process being used for creating the isolation container.

In some embodiments, the isolation container may be a container that can be packaged into a standardized unit for development, delivery, and deployment. The container fully uses a sandbox mechanism. There is no interface between containers. Container creation may be implemented by using a container engine, such as Docker (an open source application container engine). With the container engine, developers can package their applications and dependency packages to a portable isolation container, and then publish the isolation container to any popular Linux (an operating system kernel) machine, or virtualize the isolation container. The container engine may be integrated in the computer device, including a container engine client and a container engine daemon. The container engine client is a general term and may be a command-line tool, or may be a client that complies with a docker application programming interface (docker API) rule, and may be simply understood as an interface used for exchanging/transmitting an instruction. The container engine daemon is used for managing an image and a container. The container engine client may interact with a user, that is, generate a command request in response to a related operation of the user, and then transmit the command request to the container engine daemon. The container engine daemon completes a corresponding task according to the received command request, and returns a result to the container engine client.

In some embodiments, that the container engine daemon obtains the creation request for the isolation container may be that the computer device generates the creation request for the isolation container in response to a start operation that is implemented by the user by using the container engine client for the isolation container, and then transmits the creation request to the container engine daemon. The creation request may include user information, image information, loading directory information, privileged field information, and the like.

In some embodiments, the generating a container creation process for the isolation container according to the creation request may be: The computer device acquires image data for the isolation container by using the container engine daemon, and then generates the container creation process for the isolation container based on the image data and the creation request in the container engine daemon. The image corresponding to the image data is a special file system. In addition to providing files such as a program, a library, a resource, and a configuration that are required when the isolation container runs, some configuration parameters (such as an anonymous volume, an environment variable, and a user) that are prepared for the running time are further included. A relationship between an image and a container is similar to a class and an instance in object-oriented programming, where the image is a static definition, the container is an entity at which the container runs, and the container may be created, started, stopped, deleted, suspended, or the like. The acquired image data may be acquired from an image file locally stored in the computer device, or may be acquired from a remote image warehouse, which is not limited herein.

S102. The computer device forwards the creation request from the container engine daemon to a security policy agent component in response to detecting that the container creation process is started; and acquires creation dependency resource information corresponding to the isolation container from the creation request by using the security policy agent component.

S101-S102 present an example embodiment in which the computer device acquires, in response to the creation request for the isolation container, the creation dependency resource information of the isolation container.

In some embodiments, because security of the isolation container is unknown, the computer device directly creates the isolation container by using the container creation process, and then starts the isolation container to provide a service for the user, which likely causes a risk. Therefore, in this embodiment of the present disclosure, the computer device monitors the container creation process generated by the container engine daemon according to the creation request. When the container creation process is started, the computer device forwards the creation request from the container engine daemon to the security policy agent component, and acquires the creation dependency resource information from the creation request by using the security policy agent component. The security policy agent component is an application program that continues to function autonomously in a distributed system, and may be used for verifying validity of the isolation container. The creation dependency resource information is to-be-verified information in resource information depending on which the isolation container is created, and may include user information, image information, loading directory information, privileged field information, and the like.

In some embodiments, the creation request is forwarded from the container engine daemon to the security policy agent component in response to monitoring and detecting that the container creation process is started. One manner of monitoring may be: pausing, in response to detecting that the container creation process is started in a process of monitoring by using a hook script associated with the container engine daemon, running of the container creation process by using the hook script, and forwarding the creation request from the container engine daemon to the security policy agent component by using the hook script. A hook is a platform of a message processing mechanism. An application program may set a subprogram to monitor a message of a specified window, and the monitored window may be created by another process. That is, the container engine daemon may monitor, by using the hook and an associated hook script, that is, a hook program, start of the container creation process generated by the container engine daemon, and then intercept the container creation process when it is monitored that the container creation process is started, and first suspend start of the isolation container, and forward the creation request to the security policy agent component, so that the security policy agent component acquires, according to the creation request, creation dependency resource information to perform validity verification on the isolation container, and then receives a validity verification result returned by the security policy agent component, and then performs subsequent processing on the container creation process.

Another manner of monitoring may be: pausing, in response to monitoring by using a kernel hook script associated with the security policy agent component and detecting that the container creation process is started, running of the container creation process by using the kernel hook script, and acquiring the creation request from the container engine daemon by using the kernel hook script in the security policy agent component. That is, the security policy agent component may monitor, by using the hook and the associated kernel hook script, that is, a kernel hook program, start of the container creation process generated by the container engine daemon, and then intercept the container creation process when it is monitored that the container creation process is started, first pause start of the isolation container, then acquire the creation request from the container engine daemon, and then acquire, from the creation request, creation dependency resource information to perform validity verification on the isolation container, and then transmit a validity verification result to the container engine daemon, so that the container engine daemon performs subsequent processing on the container creation process.

Another manner of monitoring is: pausing, in response to monitoring by using a hook plugin associated with the container engine daemon and detecting that the container creation process is started, running of the container creation process by using the hook plugin, and transmitting the creation request to the security policy agent component by using an internal server in the hook plugin. The hook plugin runs outside the container engine daemon, and generally communicates with the container engine daemon by using a built-in server of the hook plugin. Therefore, the built-in server of the hook plugin may communicate with the security policy agent component.

S103. The computer device acquires a valid policy file for the container engine by using the security policy agent component, and performs validity verification on creation dependency resource information according to the valid policy file, to obtain a validity verification result corresponding to the isolation container.

In some embodiments, the valid policy file specifies a rule and a method for verifying the isolation container. The valid policy file may include at least one policy rule. Each policy rule may be corresponding to one piece of creation dependency resource information of the isolation container, and validity verification is performed on the creation dependency resource information. Therefore, the computer device may acquire, according to the policy rule in the valid policy file, the creation dependency resource information in the creation request by using the security policy agent component. The valid policy file may be configured by using a container security server (which may be the security server 100 shown in FIG. 1). The computer device may receive a target policy file and a signature file associated with the target policy file that are transmitted by the container security server. In some embodiments, the target policy file may be generated by the container security server according to at least one of invalid user information, an invalid image list, invalid privileged field information, a sensitive mount directory path, or an image list to be verified. The invalid image list may be acquired by the container security server from an image warehouse management system. The signature file may be obtained by the container security server by performing encryption using an owned private key.

In some embodiments, because the computer device cannot determine that the received target policy file and signature file associated with the target policy file are from the container security server, the computer device performs signature verification processing on the target signature file by using the security policy agent component, that is, acquires a public key, that is, a target public key, of the container security server, and then decrypts the signature file by using the target public key to obtain a hash value to be verified. Then the computer device acquires a file hash value corresponding to the target policy file, and verifies the signature file according to the to-be-verified hash value and the file hash value to obtain a signature verification result. The verifying the signature file according to the to-be-verified hash value and the file hash value to obtain the signature verification result may be: if the to-be-verified hash value is the same as the file hash value, determining the signature verification result as a verification success result; and if the to-be-verified hash value is different from the file hash value, determining the signature verification result as a verification failure result. If it is determined that the signature verification result is a verification success result, it indicates that both the received target policy file and the signature file are from the container security server. In other words, the signature file with verification success is obtained by the container security server by signing the target policy file by using the owned private key. The computer device stores the target policy file as a valid policy file, and then directly invokes the target policy file when performing validity verification on the isolation container.

In some embodiments, the computer device may continuously monitor, by using the security policy agent component, an update status of the target policy file by the container security server; and acquires, in response to monitoring that the updated status of the target policy file is a modified state, a modified target policy file from the container security server, and updates the stored valid policy file according to the modified target policy file.

With the valid policy file, the computer device may perform validity verification on the creation dependency resource information corresponding to the isolation container. When the creation dependency resource information corresponding to the isolation container meets the policy rule in the valid policy file, it is determined that the validity verification result of the isolation container is a valid result. When the creation dependency resource information corresponding to the isolation container does not conform to the policy rule in the valid policy file, it is determined that the validity verification result of the isolation container is an invalid result.

When validity verification is performed on the isolation container by using a plurality of policy rules together, if validity verification corresponding to one policy rule fails, it is determined that the validity verification result is an invalid result, and only when validity verification corresponding to all policy rules succeeds, it is determined that the validity verification result is a valid result.

S104. The computer device processes the container creation process according to an invalid processing mechanism when the validity verification result is an invalid result; and creates the isolation container by using the container creation process when the validity verification result is a valid result.

That is, S104 is that the computer device processes the isolation container according to the invalid processing mechanism when the validity verification result is an invalid result; and the computer device creates the isolation container when the validity verification result is a valid result.

In some embodiments, after obtaining the validity verification result by performing validity verification on the isolation container by using the security policy agent component, the computer device forwards the validity verification result to the container engine daemon. Then, the computer device may perform subsequent processing on the container creation process by using the container engine daemon.

In some embodiments, that the computer device performs subsequent processing on the container creation process by using the container engine daemon may be: creating the isolation container by using the container creation process if the validity verification result is a valid result; and if the validity verification result is an invalid result, the container creation process may be processed according to the invalid processing mechanism. For example, the container creation process is blocked, the isolation container is not created, and the processing result is transmitted to the container engine client.

Actually, the policy rules mentioned in the plurality of example embodiments of the isolation container are different in invalidity. That is, when the isolation container does not meet a policy rule, corresponding invalidity is weak, and running the isolation container faces a small risk. In this case, if a container creation process of the isolation container is directly blocked, development of a developer is affected. Therefore, the invalid processing mechanism may be divided into a first invalid processing mechanism and a second invalid processing mechanism. For example, the isolation container may be created by using the container creation process and alarm information may be transmitted to the container security server according to the first invalid processing mechanism when the invalid result is a first invalid result, so that the container security server updates the target policy file according to a running status of the isolation container and the alarm information; and when the invalid result is a second invalid result, the container creation process is blocked according to the second invalid processing mechanism, that is, creation of the isolation container is blocked. The first invalid result may represent that invalidity of the isolation container is relatively weak, and the second invalid result may represent that invalidity of the isolation container is relatively strong, that is, invalidity of the first invalid result is greater than invalidity of the second invalid result. Distinction between the first invalid result and the second invalid result may be determined according to a quantity of policy rules that are not met by the isolation container. That is, if the quantity of policy rules that are corresponding to the isolation container and that are not met by the creation dependency resource information exceeds a serious invalid threshold, it is determined that the validity verification result of the isolation container is the second invalid result; or if the quantity of policy rules that are not met by the isolation container is relatively small (but does not exceed the serious invalid threshold) and is not 0, it is determined that the validity verification result of the isolation container is the first invalid result, where the serious invalid threshold is any integer greater than 0, for example, the serious invalid threshold is 2. Alternatively, distinction between the first invalid result and the second invalid result may also be determined according to invalidity severity of the policy. If invalidity severity of the policy rule that the creation dependency resource information corresponding to the isolation container does not conform to is relatively low, it is determined that the validity verification result is the first invalid result. If invalidity severity of the policy rule that the creation dependency resource information corresponding to the isolation container does not conform to is relatively high, it is determined that the validity verification result is the second invalid result, where invalidity severity is determined by the policy rule, each policy rule has a one-to-one correspondence with invalidity severity, and different policy rules may have same or different invalidity severity. That the container security server updates the target policy file according to the running status of the isolation container and the alarm information may be that the container security server monitors the running status of the isolation container of the computer device according to the alarm information transmitted by the computer device. If a risk problem occurs during the running of the isolation container, it indicates that a determining mechanism of the first invalid result and the second invalid result in the policy file is faulty, and the determining mechanism may be adjusted, that is, the target policy file may be updated. For example, when an isolation container A performs validity verification and a policy B is violated, and invalidity severity of the policy B is low. Therefore, after validity verification is performed, the computer device still starts the isolation container A. However, the computer device transmits alarm information to the container security server, and the container security server monitors a running status of the isolation container A. If it is monitored that a running problem is caused by the isolation container A, a risk is generated, and the container security server may set invalidity severity of the policy A to high.

According to the method provided in this embodiment of the present disclosure, after the computer device obtains the creation request of the isolation container, the computer device acquires the image data according to the creation request by using the container engine daemon, and then generates the container creation process according to the image data and the creation request by using the container engine daemon, the computer device intercepts the container creation process by using a hook technology, pauses running of the container creation process, forwards the creation request to the security policy agent component by using the hook technology, acquires the creation dependency resource information in the creation request by using the security policy agent component, performs validity verification on the creation dependency resource information, and obtains the validity verification result, and returns the validity verification result to the container engine daemon process. If the validity verification result is a valid result, the computer device continues to start the isolation container by using the container creation process; otherwise, blocks start of the isolation container. According to the method provided in this embodiment of the present disclosure, validity verification is performed on the isolation container when the isolation container is started by using the container engine, thereby preventing start of an invalid container and improving security of a running environment of the isolation container.

For ease of understanding, the following further describes the foregoing data processing procedure for performing validity verification on the isolation container by using an example in which the container engine is a docker container engine.

Figure 4:
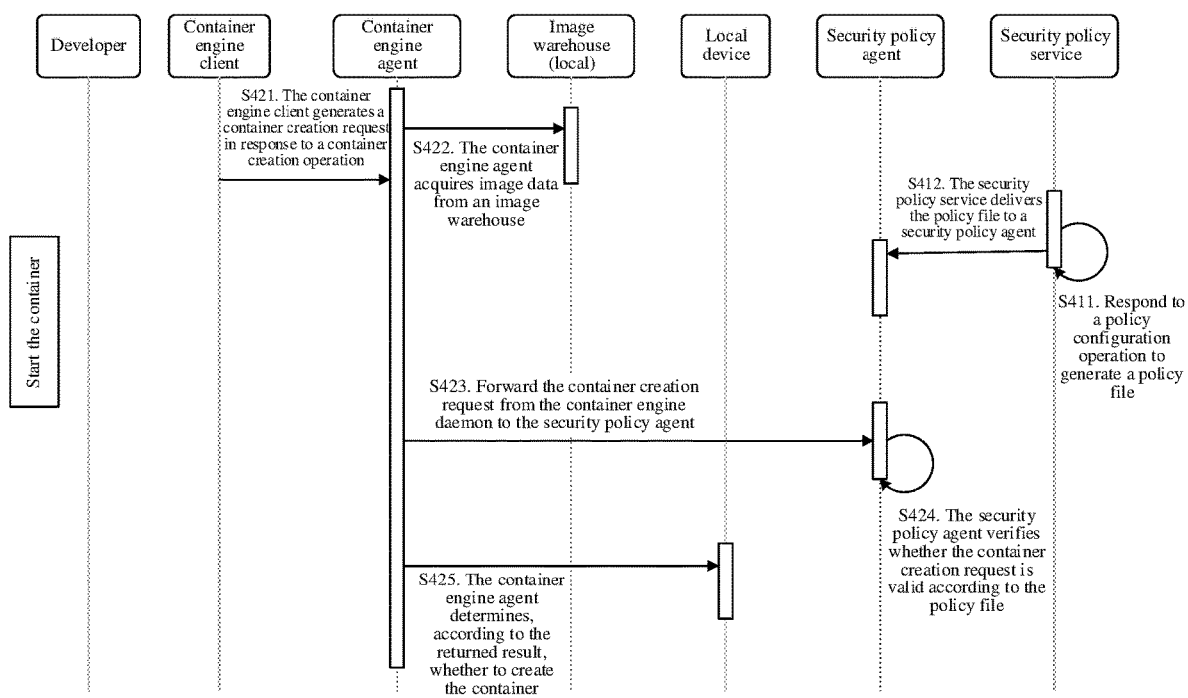
FIG. 4 is an overall flowchart of a container start protection method according to an embodiment of the present disclosure.

Further, FIG. 4 is an overall flowchart of a container start protection method according to an embodiment of the present disclosure. As shown in FIG. 4, the overall process involves a developer, a container engine client, a container engine agent (daemon), a mirror warehouse (local), a local device, a security policy agent, and a security policy service. The container engine client may provide a service for the developer by using the container engine client 11 shown in FIG. 2b, and may be docker client in the docker container engine. The container engine agent, that is, the container engine daemon described in the foregoing embodiment corresponding to FIG. 3, may be a docker daemon corresponding to the docker container engine. The image warehouse is a place where images are stored in a centralized manner, and the local image warehouse refers to an image warehouse stored in a terminal. The local device refers to a terminal used when a developer starts a container. The security policy agent is the security policy agent component described in the foregoing embodiment corresponding to FIG. 3, and may be a security policy agent (a software and hardware system). The security policy service is the container security server described in the foregoing embodiment corresponding to FIG. 3. The application client, the container engine agent, the image warehouse, and the security policy agent may be directly or indirectly invoked by using the terminal (that is, the local device), and the terminal may be any terminal in the foregoing terminal cluster shown in FIG. 1. The security policy service may be the security server 100 in FIG. 1. As shown in FIG. 4, the container start protection method may include two parts:

Part 1: Policy Delivery:

S411. The security policy service responds to a policy configuration operation to generate a policy file.

In some embodiments, the service (server) is an application program type, and may generally provide some functions for a user locally and over a network, such as a client/server application program, a database server, and another server-based application program. The security policy service is the foregoing container security server, and may run on the security server shown in FIG. 1. The security policy is the foregoing policy rule. The security policy service may be corresponding to a security policy interaction interface, and a function such as adding/deleting/modifying a policy rule is provided for the user by using the security policy interaction interface. After the user configures the policy rule by using the security policy interaction interface corresponding to the security policy service, the security policy service may respond to a policy configuration operation of the security policy interaction interface to generate a policy file (that is, the target policy file mentioned in the embodiment corresponding to FIG. 3).

S412. The security policy service delivers the policy file to a security policy agent.

In some embodiments, after generating the policy file in response to the policy configuration operation of the user, the security policy service may deliver the policy file to the security policy agent of the terminal. After confirming that the policy file comes from the security policy service, the security policy agent can store the policy file as a valid policy file. The security policy agent is also the security policy agent component involved in the foregoing embodiment, and the security policy agent component is integrated into the terminal.

Part 2: Policy Execution:

S421. A container engine client generates a container creation request in response to a container creation operation.

In some embodiments, the docker container engine serves as an open application container engine, which may bring great efficiency improvement to the developer. By using the docker, the developer may start a corresponding container (that is, the isolation container mentioned in the embodiment corresponding to FIG. 3) according to a development requirement of the developer, and then develop or run an application of the developer in the container, so that the developer does not need to set up an environment for each application and test the applications one by one. The docker includes a container engine client and a container engine daemon. The container engine client may be considered as an application client or a command tool line, and is used for interacting with the developer. The user only needs to input one or more container start commands into the container engine client of the docker. The container engine client responds to the container creation operation of the container start command, generates a container creation request, and then transmits the container creation request to the docker daemon.

S422. The container engine agent acquires image data from an image warehouse.

The container engine agent is also the container engine daemon involved in the foregoing embodiment.

In some embodiments, after receiving the creation request, the docker daemon determines, according to the creation request, an image required for starting the container, and then acquires the image data from the image warehouse.

S423. Forward the container creation request from the container engine daemon to the security policy agent.

In some embodiments, after receiving the container creation request, the docker daemon generates the corresponding container according to the container creation request, so that the developer can develop the application. However, running a malicious container causes loss to the developer. Therefore, when detecting that the docker daemon generates the corresponding container, the computer device first pauses generating the container, and forwards the container creation request from the docker daemon to the security policy agent, so that the agent performs validity verification on the container.

S424. The security policy agent verifies whether the container creation request is valid.

In some embodiments, after receiving the creation request, the security policy agent acquires creation dependency resource information from the container creation request, acquires a policy file stored in a policy delivery process, traverses policy rules in the policy file, and performs validity verification on the creation dependency resource information one by one. If the creation dependency resource information complies with each policy rule in the policy file, it indicates that the container has no risk problem corresponding to the policy file. The agent acknowledges that validity verification succeeds, and then returns true (correct) to the docker daemon, indicating no risk. If a policy rule in at least one policy file does not conform to the creation dependency resource information, it indicates that the container has at least one problem in a risk problem corresponding to the policy file. The agent acknowledges that validity verification fails, and then returns false (error) to the docker daemon, indicating that the container cannot be created.

S425. The container engine agent determines, according to the returned result, whether to create the container.

In some embodiments, that the docker daemon determines, according to a result returned by the agent, whether a container needs to be created may be: When the result returned by the agent is true, it indicates that the validity verification result is a valid result, and the docker daemon continues to create the container. When the result returned by the agent is false, it indicates that the validity verification result is invalid, and the docker daemon stops creating the container. The creating the container may be that the docker daemon generates a running instance, that is, the container, according to the obtained image corresponding to the image data. The image is actually composed of layers of system files. A file system at this layer is referred to as a union file system (UnionFS). The image may be constructed based on a dockerfile (a description file). The dockerfile includes several cipher commands, and each command creates a new hierarchy for a basic file system. Generating the container by using the image, that is, a readable/writable layer is added to the image to form a container, which is also referred to as instantiation of the image.

According to the method provided in this embodiment of the present disclosure, after generating the policy file in response to the policy configuration operation, the security policy service delivers the policy file to the security policy agent. After receiving the policy file, the security policy agent acknowledges and stores the policy file, and then the container engine client generates the container creation request in response to the container creation operation, and then transmits the container creation request to the container engine agent. The container engine agent acquires the image data from the image warehouse according to the received container creation request, then prepares to create the container according to the image data, and when detecting that the container engine agent creates the container, pauses creation of the container first, and forwards the container creation request to the security policy agent. In this case, the security policy agent acquires the previously stored policy file, performs validity verification on the creation request, returns the verification result to the container engine agent, and finally, the container engine agent determines, according to the received return result, whether to create the container. By using the method provided in this embodiment of the present disclosure, it can be ensured that validity verification is performed on the container without modifying the image itself and the container start manner. Only after validity verification on the container succeeds, the container can be created, and a malicious user can be prevented from starting a valid container, or a valid user can be prevented from starting a malicious container, so as to ensure that a permission is controllable.

Figure 5:
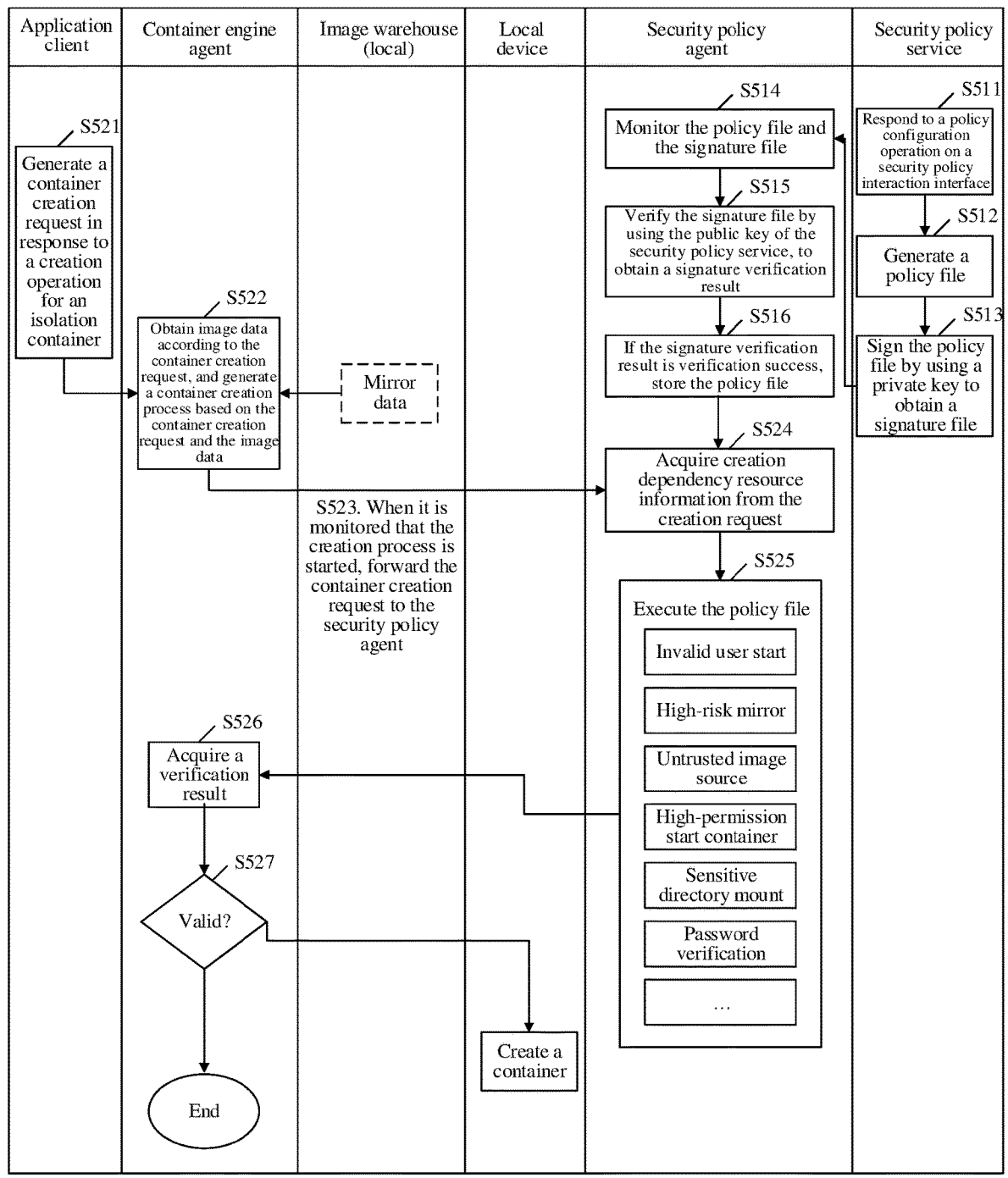
FIG. 5 is a schematic flowchart of a container start protection method according to an embodiment of the present disclosure.

Further, FIG. 5 is a schematic flowchart of a container start protection method according to an embodiment of the present disclosure. The embodiment corresponding to FIG. 5 is a further detailed overall flowchart of the container start protection method described in the embodiment corresponding to FIG. 4. As shown in FIG. 5, the container start protection method may include policy delivery and policy execution.

Policy Delivery:

S511. A security policy service responds to a policy configuration operation on a security policy interaction interface.

S512. The security policy service generates a policy file according to the policy configuration operation.

In some embodiments, a policy rule may be extended/ modified/deleted according to a requirement. The security policy service may be the security policy service server in the foregoing embodiment corresponding to FIG. 4, or may be the security policy server in the foregoing embodiment corresponding to FIG. 3. For an implementation process of the S511 and the S512, refer to the foregoing description of the S411 shown in FIG. 4. Details are not described herein again. For configuration processes of some common policy rules, refer to the following specific description of a policy delivery process in the embodiment corresponding to FIG. 6.

S513. The security policy service performs signature processing on the policy file by using a private key to obtain a signature file.

In some embodiments, signature processing means that the security policy service encrypts a hash value to be verified of the policy file by using a private key, and the file obtained by means of encryption is a signature file. The private key is a key in an asymmetric encryption technology. The private key is only held by an owner and cannot be disclosed. For example, a private key of the security policy service can only be held by the security policy service, and another computer device cannot obtain the private key. In the asymmetric encryption technology, there is another key, which is a key published by an owner to others, which is referred to as a public key, for example, a public key of the security policy service. As shown in FIG. 5, the security policy agent can also obtain the public key. The to-be-verified hash value may also be referred to as a digest, and is a hash value obtained after the security policy service performs a hash operation on the policy file.

S514. The security policy agent monitors the policy file and the signature file.

In some embodiments, the security policy agent (that is, the security policy agent in the foregoing embodiment corresponding to FIG. 4) obtains the policy file and the signature file obtained by encrypting the policy file from the server. In fact, the agent cannot confirm whether the policy file just received is from the server, whether the policy file has a transmission error, or whether the policy file is tampered with maliciously. Therefore, the agent performs signature verification processing.

S515. The security policy agent verifies the signature file by using the public key of the security policy service, to obtain a signature verification result.

In some embodiments, data encrypted by using one key in a key pair can certainly be decrypted by using the other key. Because the signature file is encrypted by the security policy service by using the private key, the security policy agent may decrypt the data by using the public key of the security policy service to obtain a hash value to be verified. Then the security policy agent may perform a hash operation on the received policy file to obtain a file hash value corresponding to the policy file, and then compare the to-be-verified hash value with the file hash value. The hash operation performed by the security policy agent on the policy file and the hash operation performed by the security policy service on the policy file need to be the same hash algorithm.

In some embodiments, if the to-be-verified hash value is the same as the file hash value, the security policy agent may confirm that the signature verification result is a verification success result. If the to-be-verified hash value is different from the file hash value, the security policy agent may confirm that the signature verification result is a verification failure result.

S516. If the signature verification result is verification success, the security policy agent stores the policy file.

In some embodiments, if the signature verification result is a verification success result, the agent stores the policy file, that is, the policy file is loaded into a memory, and the policy file stored in the memory is also the valid policy file in the foregoing embodiment.

Policy Execution:

S521. An application client generates a container creation request in response to a creation operation for an isolation container.

In some embodiments, the application client (that is, the container engine client in the foregoing embodiment corresponding to FIG. 4) may initiate a creation request for the container in response to the creation operation on the isolation container, and the creation request is first connected to a docker daemon (that is, the container engine agent component in the foregoing embodiment corresponding to FIG. 4).

S522. The container engine agent obtains image data according to the container creation request, and generates a container creation process based on the container creation request and the image data.

In some embodiments, after connecting to a local image warehouse, the docker daemon obtains image data corresponding to an image for the container, and starts to start the container based on the image. For implementation of S522, refer to a specific description of S101 in the embodiment corresponding to FIG. 3. Details are not described herein again.

S523. When it is monitored that the container creation process is started, forward the container creation request to the security policy agent.

In some embodiments, when it is monitored that the container creation process is started, the container creation request is forwarded to the security policy agent, which may be notified by the docker to the agent by using the hook technology, or may be perceived by the agent itself by using the kernel hook technology that a new container is about to be started. The hook technology is used for forwarding the container creation request, and an implementation method may be determined according to an actual situation.

In one embodiment, the agent may obtain the container creation request by using the docker hook technology: Modify the start mode of the docker daemon. Add the hook prestart configuration in the/etc/docker/daemon.json (path of a configuration file). Once the container is started, execute hooks script specified in —hook-spec (hook rule file) defined in daemon. The script notifies the agent about the container creation request.

In one embodiment, the agent may obtain the container creation request by using the docker plugin technology: The version later than Docker 1.7 supports a plugin mechanism. A new plugin runs outside the daemon, which means that the daemon itself needs to find a proper way to interact with them. Each plugin has a built-in Hypertext Transfer Protocol (HTTP) server, which is detected by the daemon, and provides a series of remote invoking interfaces to exchange JavaScript Object Notation (JSON) information by using an HTTP POST (commit) method. A remote invoking interface that each plugin needs to expose depends on a function it wants to implement. In some embodiments, by self-defining a notification agent plugin module, the docker installs the plugin. Compared with the first method, the daemon does not need to be restarted. Once a new container is started, execution of the plugin is triggered, and the container creation request in the container creation request is notified to the agent.

In one embodiment, the agent may obtain the container creation request by using the agent ftrace (kernel debugging framework) hook technology: By using the ftrace solution, the agent can intercept a registered hook program when containerd-shim starts a container header process by invoking exec (family of functions) and a container-shim (name of the container runtime) sub-process identifier to debugfs (kernel debugging file system) to a system registered and intercepted in a user state, so that the agent senses that the new container is started and acquires the container creation request from the docker daemon.

In one embodiment, the agent may obtain the container creation request by using the agent ebpf (a kernel-enhanced version of packet filtering technology) hook technology: Through the ebpf solution, an ebpf program of the C (a programming language) version may be written, or a libbpf library (a library for ebpf) may be provided by the kernel to simplify compilation of the ebpf program. Even a project bcc (a project name) or a falco (a project name) project may be open sourced to quickly develop an interception program. In the same interception manner as ftrace, the containerd-shim sub-process may be intercepted, so that the agent senses start of the new container, and then obtains the container creation request from the docker daemon.

S524. The security policy agent acquires creation dependency resource information from the container creation request.

In some embodiments, the security policy agent obtains the container creation request, may parse the container creation request, and then extract the creation dependency resource information from the container creation request.

S525. The security policy agent executes the policy file.

In some embodiments, the policy file may include at least one security policy, and each security policy may be verified against at least one piece of creation dependency resource information of the container. After obtaining the creation dependency resource information in the container creation request, the agent performs validity verification on the isolation container according to the policy file and the creation dependency resource information to obtain a validity verification result.

In one embodiment, the creation dependency resource information may be user information, and the policy file includes an invalid user information list for performing validity verification on the user information. In this case, the computer device obtains the invalid user information list from the policy file by using the security policy agent component, and then the computer device searches for the invalid user information list by traversing the user information, for example, traversing each piece of invalid user information in the invalid user information list to query whether invalid user information that is the same as the user information exists. It is determined that the validity verification result is an invalid result in response to finding invalid user information same as the obtained user information in the invalid user information list; and it is determined that the validity verification result is a valid result in response to not finding invalid user information same as the obtained user information in the invalid user information list. For example, the invalid user information included in the invalid user information list in the policy file is a user A and a user B, and the creation dependency resource information obtained from the creation request is a user C. Then, the computer device traverses the invalid user information list, and no user C is found. Therefore, if it is confirmed that the user C does not belong to the invalid user information, the computer device determines that the validity verification result is a valid result.

In one embodiment, the creation dependency resource information may include first image information, and the policy file includes an invalid image list for the first image information. In this case, the computer device may obtain the invalid image list from the policy file by using the security policy agent component, and then traverse the invalid image list according to the first image information, for example, traverse each piece of image information in the invalid image list to query whether image information same as the first image information exists. It is determined that the validity verification result is an invalid result in response to finding image information in the invalid image list same as the first image information; and it is determined that the validity verification result is a valid result in response to not finding image information in the invalid image list same as the first image information. The image information is information such as a source of the image data acquired by the isolation container, and the invalid image list in the policy file is used for recording information such as an unreliable image data source. In some embodiments, the invalid image list may include an untrusted image list and a high-risk image list, and different image lists are corresponding to image sources of different risk types. For example, the untrusted image list may include untrusted image warehouse address information. When the image source address information read from the first image information is the image warehouse address information included in the untrusted image list, it is determined that the image corresponding to the container is unreliable, and that start of the container is invalid. For example, the high-risk image list may include high-risk image information with a high-risk vulnerability. When the image information read from the first image information is high-risk image information included in the high-risk image list, it is determined that the container may have a high-risk vulnerability, and that start of the container is invalid.

In one embodiment, the policy file may contain a policy rule for a container privilege. Specifically, the computer device searches the policy file for invalid privileged field information by using the security policy agent component; searches for target privileged field information in the creation dependency resource information when the invalid privileged field information is first privileged state information; determines that the validity verification result is a valid result when the target privileged field information is not found in the creation dependency resource information; acquires privileged state information corresponding to the target privileged field information when the target privileged field information is found in the creation dependency resource information; determines that the validity verification result is an invalid result when privileged state information corresponding to the target privileged field information is effective state information; and determines that the validity verification result is a valid result when the privileged state information corresponding to the target privileged field information is ineffective state information. In other words, when the invalid privileged field information in the policy file is the first privileged state information, it is used for indicating whether the isolation container has a high privilege in this case. If the isolation container has a high privilege, it is risky to start the isolation container.

In one embodiment, the creation dependency resource information may include a loading directory path, and the policy file may include a sensitive mount directory path for the loading directory path. The computer device obtains the sensitive mount directory path from the policy file by using the security policy agent component, and then traverses the loading directory path to search for the sensitive mount directory path, for example, traverses each directory path in the sensitive mount directory path, and queries whether a directory path same as the loading directory path exists; determines that the validity verification result is an invalid result in response to finding a directory path in the sensitive mount directory path same as the loading directory path; and determines that the validity verification result is a valid result in response to not finding a directory path in the sensitive mount directory path same as the loading directory path. In a process of instantiating the image to obtain the container, a directory in the computer device is loaded into the container, and then a file system corresponding to the directory can be accessed by using the container. A path corresponding to a directory that needs to be loaded when the container starts is referred to as a loading directory path. With the loading directory path, data synchronization between the computer device and the container can be ensured. The sensitive mount directory path refers to a path that is corresponding to a directory not allowed to be loaded by the container, for example, a path corresponding to a non-access permission directory, and file content corresponding to a non-access permission directory cannot be modified. Once the directory is loaded by the container, file content corresponding to the directory can be modified. This is not allowed, because file tampering easily poses a risk.

In one embodiment, the creation dependency resource information may include second image information, and the policy file may include an image list to be verified for the second image information. The second image information may be the foregoing first image information. In some embodiments, the computer device obtains the to-be-verified image list from the policy file by using the security policy agent component; determines whether the second image information belongs to the to-be-verified image list, that is, searches the to-be-verified image list for whether image information same as the second image information exists; determines that the validity verification result is a valid result when the second image information does not belong to the to-be-verified image list; generates a password verification request by using the security policy agent component when the second image information belongs to the to-be-verified image list; acquires image password information of the isolation container according to the password verification request; determines that the validity verification result is a valid result when the image password information is valid password information; and determines that the validity verification result is an invalid result when the image password information is invalid password information. Password verification needs to be performed when the image in the to-be-verified image list starts the container. If an incorrect password is used for starting the container by using the image, it is also insecure, and validity verification fails.

The policy rule for validity verification on the isolation container mentioned in the foregoing one or more embodiments may be used simultaneously when verifying whether the isolation container is valid, or only one policy rule or a combination of at least two policy rules is used. When validity verification is performed on the isolation container by using the policy rule mentioned in the plurality of embodiments, it is considered that start of the isolation container is valid only when the creation dependency resource information meets each policy rule, that is, it is confirmed that the validity verification result is a valid result; otherwise, as long as the creation dependency resource information does not meet any policy rule, it is determined that the validity verification result is an invalid result.

As shown in FIG. 5, an example in which the agent determines, according to a type of the creation dependency resource information and a corresponding policy rule in the policy file, whether the request is reasonable is used for jointly performing validity verification on the container in the foregoing plurality of embodiments is used for description. The policy rule may be used for verifying a risky situation such as an invalid user, a high-risk image, an untrusted mirror source image, a high-permission start container, a sensitive directory mount, and password verification. In this case, the method for performing validity verification on the isolation container described in the foregoing embodiment is used. A verification process by the agent may be as follows:

Invalid user verification: The agent can check start parameter user information. If it is root (super user), the agent returns false (error), indicating that the validity verification result is an invalid result. Otherwise, the agent continues to check a next policy.

High-risk mirror verification: The agent can obtain the image information in the creation request, and then determine whether the image information exists in the imagelist (high-risk image list) in the policy. If the image information exists, the agent returns false, indicating that the validity verification result is an invalid result. Otherwise, the agent continues to check a next policy.

Untrusted image source verification: The agent can obtain the image information in the creation request, and then determine whether the image information is in replist (untrusted image list) in the policy. If yes, the agent returns false, indicating that the validity verification result is an invalid result. Otherwise, the agent continues to check a next policy.

High-permission start verification: When "Privileged: true" is defined in the policy (indicating that the invalid privileged field information is in an effective state), the agent may obtain the privileged (privilege) field information in the creation request, and determine whether the privileged field information is effective state information, that is, privileged=true (correct), indicating that the container has a high permission, is invalid, and returns true. During high-permission start verification, returning true indicates that the validity verification result is an invalid result. Otherwise, a next policy continues to be checked.

Sensitive directory loading verification: The agent can obtain the loading directory in the creation request, and determine whether the obtained loading directory is in a secret path (sensitive directory mount path) in the policy. If it exists, the agent returns false, indicating that the validity verification result is an invalid result. Otherwise, the agent continues to check a next policy.

Password verification: The agent can check whether the image starting the container is in imagelist in the policy. If not, the agent returns true. If yes, the agent performs password verification. If the password verification succeeds, the agent returns true. If the password verification fails, the agent returns false.

When verification corresponding to any one of the foregoing policies fails, the validity verification result is an invalid result.

S526. The container engine agent obtains a verification result from the security policy agent.

In some embodiments, the agent returns the verification result to the docker daemon.

In one embodiment, after the agent completes execution of the validity verification policy, if the execution method field in the policy is warning, an alarm is transmitted to the server by using the agent, but true is always returned to the daemon, that is, the verification result is a valid result. If it is blocked, true is returned to the daemon. If it is verified, password verification is performed. If the verification succeeds, true is returned to the daemon. Otherwise, false is returned, indicating that the verification result is an invalid result.

S527. If the verification result is a valid result, start the container by using the security engine agent. If the verification result is an invalid result, start of the container is terminated by using the security engine agent.

According to the method provided in this embodiment of the present disclosure, validity verification is performed on the isolation container according to the policy in the policy file, the policy in the policy file may be deleted, added, or modified according to an actual application situation, and protection is performed before the isolation container is started, thereby preventing start of a malicious container.

Figure 6:
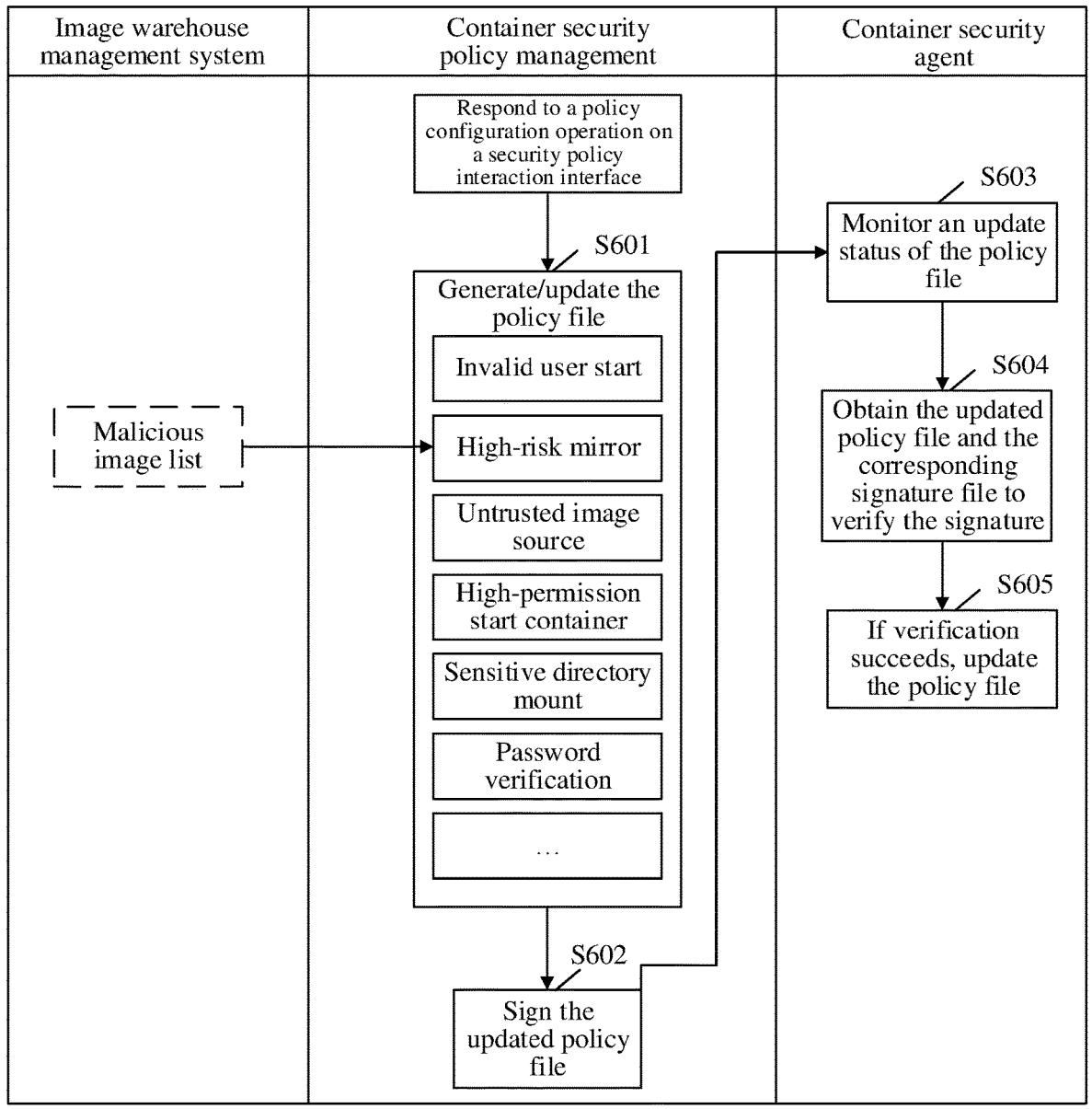
FIG. 6 is a schematic flowchart of a policy delivery process according to an embodiment of the present disclosure.

Further, FIG. 6 is a schematic flowchart of a policy delivery process according to an embodiment of the present disclosure. The embodiment corresponding to FIG. 6 further details the policy delivery method described in the embodiment corresponding to FIG. 4 or FIG. 5. As shown in FIG. 6, the policy delivery process includes:

S601. A container security policy management responds to a policy configuration operation on a security policy interaction interface, and updates a policy file.

In some embodiments, the container security policy management is the security policy service in the foregoing embodiment corresponding to FIG. 5, that is, a server. As shown in FIG. 6, a user may configure a policy rule for secure start of a container of a running node on a server, and the policy rule may be extended/modified/deleted according to a requirement. Configuration of some major policy rules is shown in Table 1.

TABLE 1

| Policy type | Policy parameter | Execution mode |
| --- | --- | --- |
| Policy 001: Invalid user start | Userlist<br>For example, root: admin | Block/alarm |
| Policy002: High-risk image list | Imagelist<br>For example,<br>nginx: 1.3.1; mysql: 3.0<br>(mirror name) | Block/alarm |
| Policy003: Untrusted image source | Replist<br>For example,<br>Tcr/ccr/dockerhub (mirror source) | Block/alarm |
| Policy004: High-permission start | Privilege<br>For example, true | Block/alarm |
| Policy005: Sensitive directory mount | Secret Path<br>For example, /etc<br>(file path) | Block/alarm |
| Policy006: Password verification | Imagelist, password | Verification blocking |

As shown in Table 1, policy 001: For invalid user start, a policy parameter is set to userlist. Invalid user information, such as root:admin, can be added to the userlist. In this case, if the agent finds the same user information as the invalid user information added in the userlist in the creation dependency resource information of the container, the agent can block start of the container or allow the container to start but transmit alarm information to the server.

As shown in Table 1, for Policy002: high-risk image list, a policy parameter is set to imagelist. An image name with a high risk may be added to the imagelist, for example, nginx:1.3.1 and mysql:3.0. In this case, if the agent finds, in the creation dependency resource information of the container, an image name same as the image name with a high risk added to the imagelist, start of the container may be blocked, or the container is enabled but alarm information is transmitted to the server. The image included in the high-risk image list may be obtained from an image warehouse management system by using an external system interface.

As shown in Table 1, for Policy003: untrusted image source is, a policy parameter is set to replist. An untrusted image source may be added to the replist, for example, Tcr/ccr/dockerhub. In this case, if the agent finds, in the creation dependency resource information of the container, image information same as the untrusted image information added to the replist, start of the container may be blocked, or the container is allowed to be started but alarm information is transmitted to the server.

As shown in Table 1, for Policy004: high-permission start, a policy parameter is set to privilege. The privileged state information may be set to true, that is, "Privileged": "True". In this case, the agent searches the creation dependency resource information of the container for privileged field information. If the privileged field information is found in the creation dependency resource information and it is determined that status information of the privileged field information is also true, start of the container may be blocked, or the container is enabled but alarm information is transmitted to the server.

As shown in Table 1, for Policy005: sensitive directory mounting, a policy parameter is set to secret path. A sensitive directory path, such as/etc, may be added to the secret path. In this case, if the agent finds, in the creation dependency resource information of the container, a directory path same as the sensitive directory path added to the secret path, start of the container may be blocked, or the container is allowed to be started but alarm information is transmitted to the server.

As shown in Table 1, for Policy006: password verification, a policy parameter is set to imagelist and password. An image name that requires password verification may be added to the imagelist, and a password corresponding to the image is added to the password. In this case, if the agent determines that the image name corresponding to the container is in the imagelist, password verification is performed on the container. When the obtained password verification password is the same as the password corresponding to the container in the password, the container is started. Otherwise, start of the container is blocked.

The policy file may be changed at any time according to a requirement. Therefore, after the policy file is generated in response to the policy configuration operation for the first time, the container security policy management can respond to the policy configuration operation of updating the policy rule, and update the policy file. It may be understood that generating the policy file may also be considered as special update of the policy file. Therefore, the updated policy file is subsequently used for description.

S602. The container security policy management signs the updated policy file.

In some embodiments, after the policy file is updated each time, the container security policy server signs the updated policy file by using a private key, to obtain a corresponding signature file. Then, the server delivers the signature file and the updated policy file to the agent of the node running by the user (that is, each terminal in the terminal cluster shown in FIG. 1). For a specific process of signing, refer to a specific description of S513 in the embodiment corresponding to FIG. 5. Details are not described herein again.

S603. The container security agent monitors an update status of the policy file.

In some embodiments, the container security agent monitors a fixed directory of the server, that is, a directory corresponding to the policy file. If it is detected that modification occurs, the policy is reloaded.

S604. The container security agent obtains the updated policy file and the corresponding signature file to verify the signature.

In some embodiments, for a specific process of verifying the signature, refer to a specific description of S515 in the embodiment corresponding to FIG. 5. Details are not described herein again.

S605. If verification succeeds, update the policy file.

In some embodiments, after verification succeeds, the agent loads the updated policy file into the memory.

According to the method provided in this embodiment of the present disclosure, the policy rule may be configured by using the container security policy management, and then the policy file is generated according to the configured policy rule. Then, the policy file is signed and then delivered to the container security agent. The container security agent needs to verify the signature to load the policy file into the memory, so as to ensure security of the policy file, further ensure correctness of the container during validity verification, and improve running security of the container.

Figure 7:
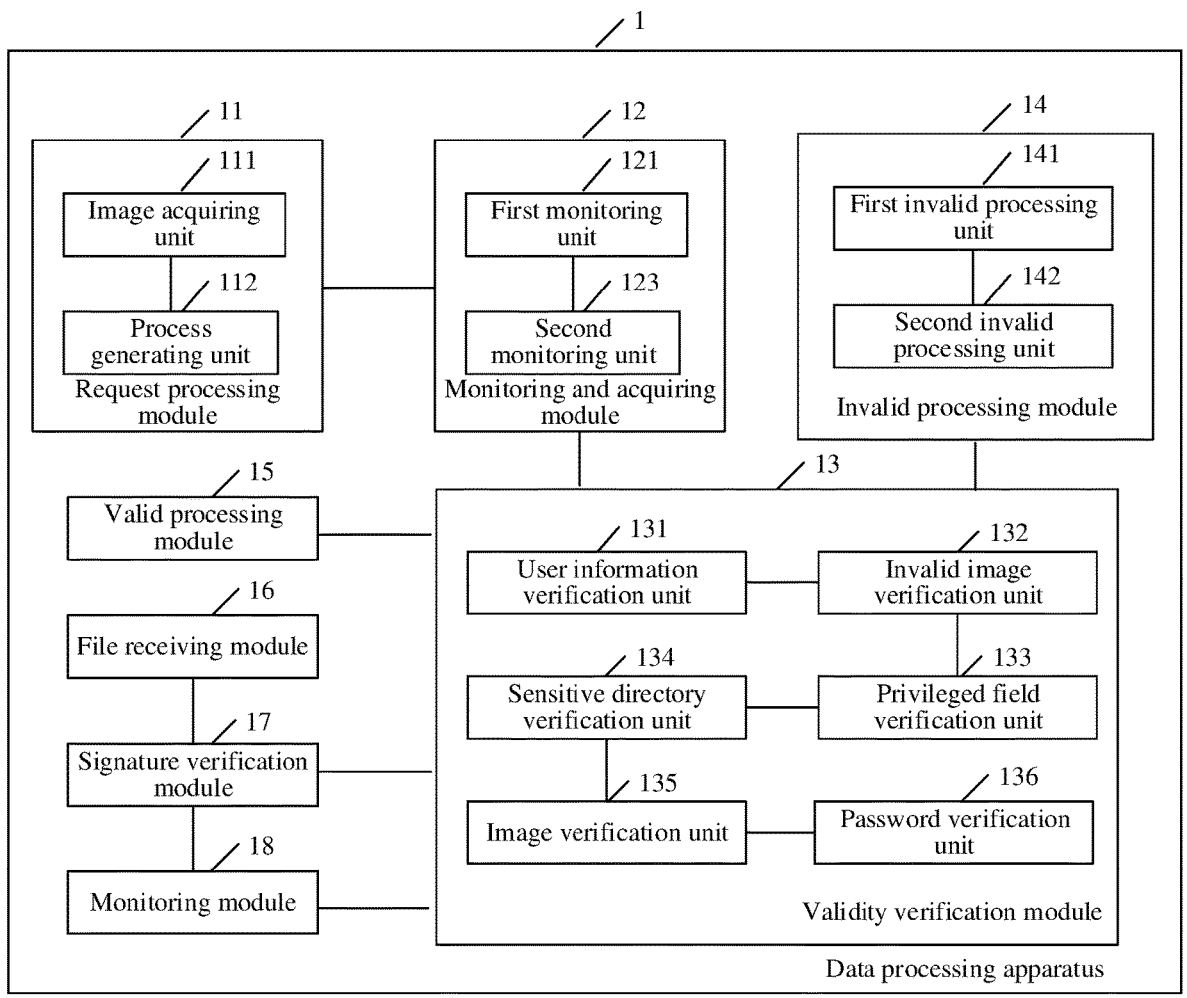
FIG. 7 is a schematic structural diagram of a data processing apparatus based on a container engine according to an embodiment of the present disclosure.

Further, FIG. 7 is a schematic structural diagram of a data processing apparatus based on a container engine according to an embodiment of the present disclosure. The foregoing data processing apparatus may be a computer program (including program code) running in a computer device. For example, the data processing apparatus is application software. The apparatus may be configured to perform corresponding steps in the method provided in the embodiment of the present disclosure. As shown in FIG. 7, the data processing apparatus 1 may include: a request processing module 11, a process monitoring module 12, a monitoring and acquiring module 13, an invalid processing module 14, and a valid processing module 15.

The request processing module 11 is configured to: generate, when a container engine daemon obtains a creation request for an isolation container, a container creation process for the isolation container according to the creation request, the container creation process being used for creating the isolation container;

the monitoring and acquiring module 12 is configured to: forward the creation request from the container engine daemon to a security policy agent component in response to detecting that the container creation process is started; and acquire creation dependency resource information corresponding to the isolation container from the creation request by using the security policy agent component;

that is, the monitoring and acquiring module 12 is configured to acquire, in response to the creation request for the isolation container, the creation dependency resource information of the isolation container;

the validity verification module 13 is configured to: acquire a valid policy file for the container engine by using the security policy agent component, and perform validity verification on creation dependency resource information according to the valid policy file, to obtain a validity verification result corresponding to the isolation container;

that is, the validity verification module 13 is configured to perform validity verification on the creation dependency resource information based on the valid policy file of the container engine corresponding to the isolation container, to obtain the validity verification result of the isolation container;

the invalid processing module 14 is configured to: process the container creation process according to an invalid processing mechanism when the validity verification result is an invalid result; and the valid processing module 15 is configured to create the isolation container by using the container creation process when the validity verification result is a valid result.

That is, the validity processing module 15 is configured to create the isolation container when the validity verification result is a valid result.

For specific function implementations of the request processing module 11, the monitoring and acquiring module 12, the validity verification module 13, the invalid processing module 14, and the valid processing module 15, refer to specific descriptions of step S101 to step S104 in the embodiment corresponding to FIG. 3. Details are not described herein again.

Still referring to FIG. 7, the request processing module 11 may include: an image acquiring unit 111 and a process generating unit 112.

The image acquiring unit 111 is configured to: acquire image data for the isolation container by using the container engine daemon when the container engine daemon obtains the creation request for the isolation container; and the process generation unit 112 is configured to generate the container creation process for the isolation container based on the image data and the creation request in the container engine daemon.

For specific function implementations of the image acquiring unit 111 and the process generating unit 112, refer to a specific description of step S101 in the embodiment corresponding to FIG. 3. Details are not described herein again.

Still referring to FIG. 7, the monitoring and acquiring module 12 may include: a first monitoring unit 121.

The first monitoring unit 121 is configured to: pause, in response to monitoring by using a hook script associated with the container engine daemon and detecting that the container creation process is started, running of the container creation process by using the hook script, and forward the creation request from the container engine daemon to the security policy agent component by using the hook script.

For a specific function implementation of the first monitoring unit 121, refer to a specific description of step S102 in the embodiment corresponding to FIG. 3. Details are not described herein again.

Still referring to FIG. 7, the monitoring and acquiring module 12 may include: a second monitoring unit 122.

The second monitoring unit 122 is configured to: pause, in response to monitoring by using a kernel hook script associated with the security policy agent component and detecting that the container creation process is started, running of the container creation process by using the kernel hook script, and acquire the creation request from the container engine daemon by using the kernel hook script in the security policy agent component.

For a specific function implementation of the second monitoring unit 122, refer to a specific description of step S102 in the embodiment corresponding to FIG. 3. Details are not described herein again.

The creation dependency resource information includes user information; and

Still referring to FIG. 7, the validity verification module 13 may include: a user information verification unit 131.

The user information verification unit 131 is configured to acquire an invalid user information list from the valid policy file by using the security policy agent component;

the user information verification unit 131 is further configured to search for an invalid user information list by traversing the user information;

the user information verification unit 131 is further configured to: determine that the validity verification result is an invalid result in response to finding invalid user information in the invalid user information list same as the user information comprised in the creation dependency resource information; and the user information verification unit 131 is further configured to: determine that the validity verification result is a valid result in response to not finding invalid user information in the invalid user information list same as the user information comprised in the creation dependency resource information.

For a specific function implementation of the user information verification unit 131, refer to a specific description of step S525 in the embodiment corresponding to FIG. 5. Details are not described herein again.

The creation dependency resource information includes first image information.

Still referring to FIG. 7, the validity verification module 13 may include: an invalid image verification unit 132.

The invalid image verification unit 132 is configured to acquire an invalid image list from the valid policy file by using the security policy agent component;

the invalid image verification unit 132 is further configured to search for the invalid image list by traversing the first image information;

the invalid image verification unit 132 is further configured to: determine that the validity verification result is an invalid result in response to finding image information in the invalid image list same as the first image information; and the invalid image verification unit 132 is further configured to: determine that the validity verification result is a valid result in response to not finding image information in the invalid image list same as the first image information.

For a specific function implementation of the invalid image verification unit 132, refer to a specific description of step S525 in the embodiment corresponding to FIG. 5. Details are not described herein again.

Still referring to FIG. 7, the validity verification module 13 may include: a privileged field verification unit 133.

The privileged field verification unit 133 is configured to search the valid policy file for invalid privileged field information by using the security policy agent component;

the privileged field verification unit 133 is further configured to: search for target privileged field information in the creation dependency resource information when the invalid privileged field information is first privileged state information;

the privileged field verification unit 133 is further configured to: determine that the validity verification result is a valid result when the target privileged field information is not found in the creation dependency resource information;

the privileged field verification unit 133 is further configured to: acquire privileged state information corresponding to the target privileged field information when the target privileged field information is found in the creation dependency resource information;

the privileged field verification unit 133 is further configured to: determine that the validity verification result is an invalid result when privileged state information corresponding to the target privileged field information is effective state information; and the privileged field verification unit 133 is further configured to: determine that the validity verification result is a valid result when the privileged state information corresponding to the target privileged field information is ineffective state information.

For a specific function implementation of the privileged field verification unit 133, refer to a specific description of step S525 in the embodiment corresponding to FIG. 5. Details are not described herein again.

The creation dependency resource information includes a loading directory path; and Still referring to FIG. 7, the validity verification module 13 may include: a sensitive directory verification unit 134.

The sensitive directory verification unit 134 is configured to acquire a sensitive mount directory path from the valid policy file by using the security policy agent component;

the sensitive directory verification unit 134 is further configured to search for a sensitive mount directory path by traversing the loading directory path;

the sensitive directory verification unit 134 is further configured to: determine that the validity verification result is an invalid result in response to finding a directory path in the sensitive mount directory path same as the loading directory path; and the sensitive directory verification unit 134 is further configured to: determine that the validity verification result is a valid result in response to not finding a directory path in the sensitive mount directory path same as the loading directory path.

For a specific function implementation of the sensitive directory verification unit 134, refer to a specific description of step S525 in the embodiment corresponding to FIG. 5. Details are not described herein again.

The creation dependency resource information includes second image information.

Still referring to FIG. 7, the validity verification module 13 may include: an image verification unit 135 and a password verification unit 136.

The image verification unit 135 is configured to acquire an image list to be verified from the valid policy file by using the security policy agent component;

the image verification unit 135 is further configured to: determine that the validity verification result is a valid result when the second image information does not belong to the to-be-verified image list;

the image verification unit 135 is further configured to: generate a password verification request by using the security policy agent component when the second image information belongs to the to-be-verified image list;

the password verification unit 136 is configured to acquire image password information of the isolation container according to the password verification request;

the password verification unit 136 is further configured to: determine that the validity verification result is a valid result when the image password information is valid password information; and the password verification unit 136 is further configured to: determine that the validity verification result is an invalid result when the image password information is invalid password information.

For specific function implementations of the image verification unit 135 and the password verification unit 136, refer to a specific description of step S525 in the embodiment corresponding to FIG. 5. Details are not described herein again.

Still referring to FIG. 7, the data processing apparatus 1 may further include: a file receiving module 16 and a signature verification module 17.

The file receiving module 16 is configured to receive a target policy file and a signature file associated with the target policy file that are transmitted by a container security server;

the signature verification module 17 is configured to acquire a target public key; the target public key being a public key of the container security server;

the signature verification module 17 is further configured to: decrypt the signature file by using the target public key to obtain a hash value to be verified, acquire a file hash value corresponding to the target policy file, and verify the signature file according to the to-be-verified hash value and the file hash value to obtain a signature verification result; and the signature verification module 17 is further configured to: store the target policy file as the valid policy file for the container engine when the signature verification result is a verification success result; a signature file with verification success being obtained by the container security server by signing the target policy file by using an owned private key.

For specific function implementations of the file receiving module 16 and the signature verification module 17, refer to a specific description of steps S514 and S515 in the embodiment corresponding to FIG. 5. Details are not described herein again.

Still referring to FIG. 7, the data processing apparatus 1 may further include: a monitoring module 18.

The monitoring module 18 is configured to monitor an update status of the target policy file by the container security server; and the monitoring module 18 is further configured to: acquire, in response to monitoring that the updated status of the target policy file is a modified state, a modified target policy file from the container security server, and update the valid policy file for the container engine according to the modified target policy file.

For a specific function implementation of the monitoring module 18, refer to a specific description of step S602 to step S605 in the embodiment corresponding to FIG. 6. Details are not described herein again.

The target policy file is generated by the container security server according to at least one of invalid user information, an invalid image list, invalid privileged field information, a sensitive mount directory path, or an image list to be verified; and the invalid image list is acquired by the container security server from an image warehouse management system.

Still referring to FIG. 7, the invalid processing module 14 may include: a first invalid processing unit 141 and a second invalid processing unit 142.

The first invalid processing unit 141 is configured to: create the isolation container by using the container creation process and transmit alarm information to the container security server according to a first invalid processing mechanism when the invalid result is a first invalid result, so that the container security server updates the target policy file according to a running status of the isolation container and the alarm information; and the second invalid processing unit 142 is configured to: block the container creation process according to a second invalid processing mechanism when the invalid result is a second invalid result, that is, block creation of the isolation container.

For specific function implementations of the first invalid processing unit 141 and the second invalid processing unit 142, refer to a specific description of step S104 in the embodiment corresponding to FIG. 3. Details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 8:
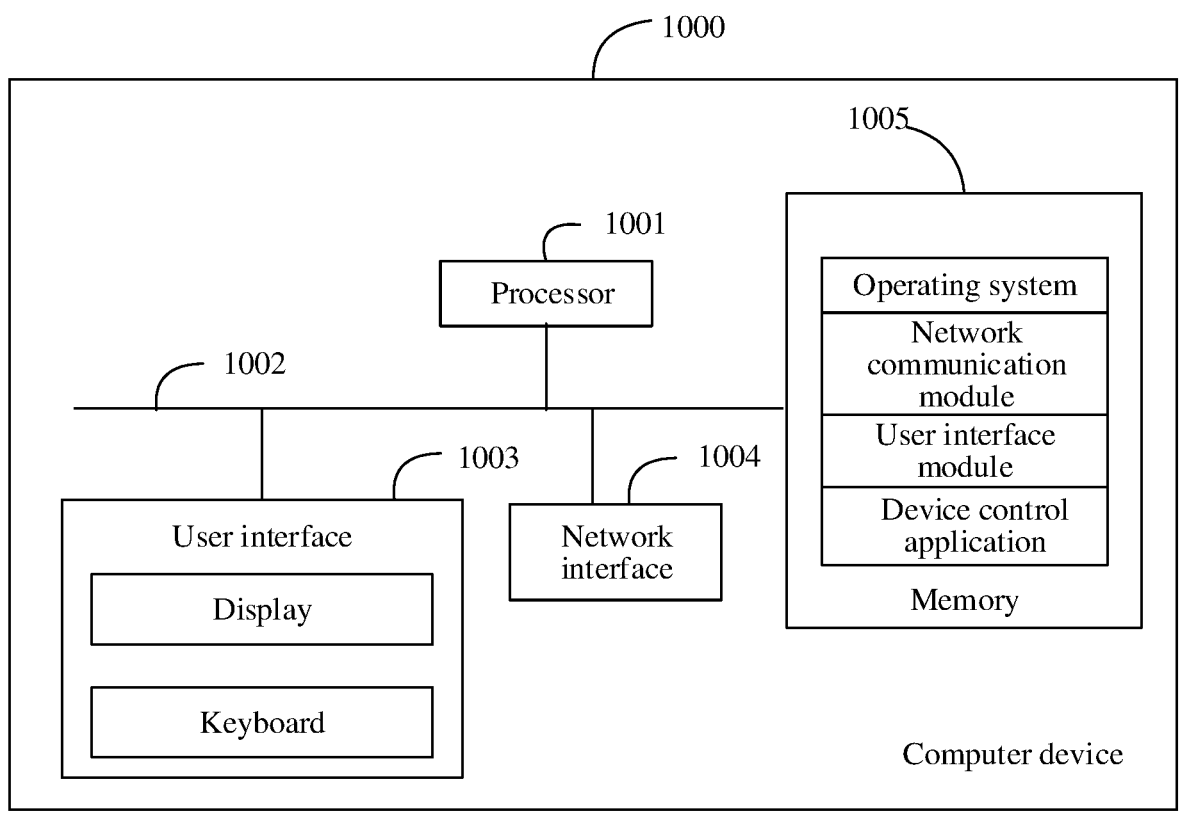
FIG. 8 is a schematic structural diagram of a computer device according to an embodiment of the present disclosure.

Further, FIG. 8 is a schematic structural diagram of a computer device according to an embodiment of the present disclosure. As shown in FIG. 8, the data processing apparatus 1 in the foregoing embodiment corresponding to FIG. 7 may be applied to the foregoing computer device 1000, and the foregoing computer device 1000 may include: a processor 1001, a network interface 1004, and a memory 1005. In addition, the foregoing computer device 1000 further includes: a user interface 1003 and at least one communication bus 1002. The communication bus 1002 is configured to implement connection and communication between these components. The user interface 1003 may include a display and a keyboard. In some embodiments, the user interface 1003 may further include a standard wired interface and wireless interface. The network interface 1004 may include a standard wired interface and wireless interface (for example, a Wi-Fi interface). The memory 1005 may be a high-speed RAM memory, or may be a non-volatile memory, for example, at least one magnetic disk memory. In some embodiments, the memory 1005 may be at least one storage apparatus that is located far away from the foregoing processor 1001. As shown in FIG. 8, the memory 1005 used as a computer readable storage medium may include an operating system, a network communication module, a user interface module, and a device-control application program.

In the computer device 1000 shown in FIG. 8, the network interface 1004 may provide a network communication function. The user interface 1003 is mainly configured to provide an input interface for a user. The processor 1001 may be configured to invoke the device-control application program stored in the memory 1005 to implement: acquiring, in response to a creation request for an isolation container, creation dependency resource information of the isolation container; performing validity verification on the creation dependency resource information based on a valid policy file of a container engine corresponding to the isolation container, to obtain a validity verification result of the isolation container; and creating the isolation container when the validity verification result is a valid result.

In some embodiments, the processor 1001 may be configured to invoke the device-control application program stored in the memory 1005 to implement: generating, when a container engine daemon obtains a creation request for an isolation container, a container creation process for the isolation container according to the creation request, the container creation process being used for creating the isolation container; forwarding the creation request from the container engine daemon to a security policy agent component in response to detecting that the container creation process is started, and acquiring the creation dependency resource information corresponding to the isolation container from the creation request by using the security policy agent component.

In some embodiments, the processor 1001 may be configured to invoke the device-control application program stored in the memory 1005 to implement: acquiring image data of the isolation container by using the container engine daemon when the container engine daemon obtains the creation request; and generating the container creation process based on the image data and the creation request in the container engine daemon.

In some embodiments, the processor 1001 may be configured to invoke the device-control application program stored in the memory 1005 to implement: pausing, in response to monitoring by using a hook script associated with the container engine daemon and detecting that the container creation process is started, running of the container creation process by using the hook script, and forwarding the creation request from the container engine daemon to the security policy agent component by using the hook script.

In some embodiments, the processor 1001 may be configured to invoke the device-control application program stored in the memory 1005 to implement: pausing, in response to monitoring by using a kernel hook script associated with the security policy agent component and detecting that the container creation process is started, running of the container creation process by using the kernel hook script, and acquiring the creation request from the container engine daemon by using the kernel hook script in the security policy agent component.

In some embodiments, the processor 1001 may be configured to invoke the device-control application program stored in the memory 1005 to implement: pausing, in response to monitoring by using a hook plugin associated with the container engine daemon and detecting that the container creation process is started, running of the container creation process by using the hook plugin, and transmitting the creation request to the security policy agent component by using an internal server in the hook plugin.

In some embodiments, the processor 1001 may be configured to invoke the device-control application program stored in the memory 1005 to implement: acquiring a valid policy file for the container engine by using the security policy agent component, and performing validity verification on creation dependency resource information according to the valid policy file, to obtain a validity verification result corresponding to the isolation container.

In some embodiments, the creation dependency resource information includes user information, and the processor 1001 may be configured to invoke the device-control application program stored in the memory 1005 to implement: acquiring an invalid user information list from the valid policy file by using the security policy agent component; determining that the validity verification result is an invalid result in response to finding invalid user information in the invalid user information list same as the user information comprised in the creation dependency resource information; and determining that the validity verification result is a valid result in response to not finding invalid user information in the invalid user information list same as the user information comprised in the creation dependency resource information.

In some embodiments, the creation dependency resource information includes first image information, and the processor 1001 may be configured to invoke the device-control application program stored in the memory 1005 to implement: acquiring an invalid image list from the valid policy file by using the security policy agent component; determining that the validity verification result is an invalid result in response to finding image information in the invalid image list same as the first image information; and determining that the validity verification result is a valid result in response to not finding image information in the invalid image list same as the first image information.

In some embodiments, the processor 1001 may be configured to invoke the device-control application program stored in the memory 1005 to implement: searching the valid policy file for invalid privileged field information by using the security policy agent component; searching for target privileged field information in the creation dependency resource information when the invalid privileged field information is first privileged state information; determining that the validity verification result is a valid result when the target privileged field information is not found in the creation dependency resource information; acquiring privileged state information corresponding to the target privileged field information when the target privileged field information is found in the creation dependency resource information; determining that the validity verification result is an invalid result when the privileged state information is effective state information; and determining that the validity verification result is a valid result when the privileged state information is ineffective state information.

In some embodiments, the creation dependency resource information includes a loading directory path; and the processor 1001 may be configured to invoke the device-control application program stored in the memory 1005 to implement: acquiring a sensitive mount directory path from the valid policy file by using the security policy agent component; determining that the validity verification result is an invalid result in response to finding a directory path in the sensitive mount directory path same as the loading directory path; and determining that the validity verification result is a valid result in response to not finding a directory path in the sensitive mount directory path same as the loading directory path.

In some embodiments, the creation dependency resource information includes second image information; and the processor 1001 may be configured to invoke the device-control application program stored in the memory 1005 to implement: acquiring an image list to be verified from the valid policy file by using the security policy agent component; determining that the validity verification result is a valid result when the second image information does not belong to the to-be-verified image list; generating a password verification request by using the security policy agent component when the second image information belongs to the to-be-verified image list; acquiring image password information of the isolation container according to the password verification request; determining that the validity verification result is a valid result when the image password information is valid password information; and determining that the validity verification result is an invalid result when the image password information is invalid password information.

In some embodiments, the processor 1001 may be configured to invoke the device-control application program stored in the memory 1005 to implement: receiving a target policy file and a signature file associated with the target policy file that are transmitted by a container security server; acquiring a target public key; the target public key being a public key of the container security server; decrypting the signature file by using the target public key to obtain a hash value to be verified, acquiring a file hash value corresponding to the target policy file, and verifying the signature file according to the to-be-verified hash value and the file hash value to obtain a signature verification result; and storing the target policy file as the valid policy file when the signature verification result is a verification success result; a signature file with verification success being obtained by the container security server by signing the target policy file by using an owned private key.

In some embodiments, the processor 1001 may be configured to invoke the device-control application program stored in the memory 1005 to implement: monitoring an update status of the target policy file by the container security server; and acquiring, in response to monitoring that the updated status of the target policy file is a modified state, a modified target policy file from the container security server, and updating the valid policy file according to the modified target policy file.

In some embodiments, the target policy file is generated by the container security server according to at least one of invalid user information, an invalid image list, invalid privileged field information, a sensitive mount directory path, or an image list to be verified; and the invalid image list is acquired by the container security server from an image warehouse management system.

In some embodiments, the processor 1001 may be configured to invoke the device-control application program stored in the memory 1005 to implement: processing the isolation container according to an invalid processing mechanism when the validity verification result is an invalid result.

In some embodiments, the processor 1001 may be configured to invoke the device-control application program stored in the memory 1005 to implement: creating the isolation container and transmitting alarm information to the container security server when the invalid result is a first invalid result, so that the container security server updates the target policy file according to a running status of the isolation container and the alarm information; and blocking creation of the isolation container when the invalid result is a second invalid result.

It is to be understood that the computer device 1000 described in this embodiment of the present disclosure may perform description of the data processing method based on a container engine in the foregoing embodiment corresponding to FIG. 3, or may perform description of the data processing apparatus 1 based on a container engine in the foregoing embodiment corresponding to FIG. 7, and details are not described herein again. In addition, the description of beneficial effects of the same method are not described herein again.

In addition, an embodiment of the present disclosure further provides a computer readable storage medium, and the computer readable storage medium stores a computer program executed by the foregoing data processing apparatus 7. When executing the computer program, the processor can perform the following operations: acquiring, in response to a creation request for an isolation container, creation dependency resource information of the isolation container;

performing validity verification on the creation dependency resource information based on a valid policy file of a container engine corresponding to the isolation container, to obtain a validity verification result of the isolation container; and creating the isolation container when the validity verification result is a valid result.

In some embodiments, when executing the computer program, the processor can perform the following operations: generating, when a container engine daemon obtains a creation request for an isolation container, a container creation process for the isolation container according to the creation request, the container creation process being used for creating the isolation container; forwarding the creation request from the container engine daemon to a security policy agent component in response to detecting that the container creation process is started, and acquiring the creation dependency resource information corresponding to the isolation container from the creation request by using the security policy agent component.

In some embodiments, when executing the computer program, the processor can perform the following operations: acquiring image data of the isolation container by using the container engine daemon when the container engine daemon obtains the creation request; and generating the container creation process based on the image data and the creation request in the container engine daemon.

In some embodiments, when executing the computer program, the processor can perform the following operations: pausing, in response to monitoring by using a hook script associated with the container engine daemon and detecting that the container creation process is started, running of the container creation process by using the hook script, and forwarding the creation request from the container engine daemon to the security policy agent component by using the hook script.

In some embodiments, when executing the computer program, the processor can perform the following operations: pausing, in response to monitoring by using a kernel hook script associated with the security policy agent component and detecting that the container creation process is started, running of the container creation process by using the kernel hook script, and acquiring the creation request from the container engine daemon by using the kernel hook script in the security policy agent component.

In some embodiments, when executing the computer program, the processor can perform the following operations: pausing, in response to monitoring by using a hook plugin associated with the container engine daemon and detecting that the container creation process is started, running of the container creation process by using the hook plugin, and transmitting the creation request to the security policy agent component by using an internal server in the hook plugin.

In some embodiments, when executing the computer program, the processor can perform the following operations: acquiring a valid policy file for the container engine by using the security policy agent component, and performing validity verification on creation dependency resource information according to the valid policy file, to obtain a validity verification result corresponding to the isolation container.

In some embodiments, the creation dependency resource information includes user information, and when executing the computer program, the processor can perform the following operations: acquiring an invalid user information list from the valid policy file by using the security policy agent component; determining that the validity verification result is an invalid result in response to finding invalid user information in the invalid user information list same as the user information comprised in the creation dependency resource information; and determining that the validity verification result is a valid result in response to not finding invalid user information in the invalid user information list same as the user information comprised in the creation dependency resource information.

In some embodiments, the creation dependency resource information includes first image information, and when executing the computer program, the processor can perform the following operations: acquiring an invalid image list from the valid policy file by using the security policy agent component; determining that the validity verification result is an invalid result in response to finding image information in the invalid image list same as the first image information; and determining that the validity verification result is a valid result in response to not finding image information in the invalid image list same as the first image information.

In some embodiments, when executing the computer program, the processor can perform the following operations: searching the valid policy file for invalid privileged field information by using the security policy agent component; searching for target privileged field information in the creation dependency resource information when the invalid privileged field information is first privileged state information; determining that the validity verification result is a valid result when the target privileged field information is not found in the creation dependency resource information; acquiring privileged state information corresponding to the target privileged field information when the target privileged field information is found in the creation dependency resource information; determining that the validity verification result is an invalid result when the privileged state information is effective state information; and determining that the validity verification result is a valid result when the privileged state information is ineffective state information.

In some embodiments, the creation dependency resource information includes a loading directory path; and when executing the computer program, the processor can perform the following operations: acquiring a sensitive mount directory path from the valid policy file by using the security policy agent component; determining that the validity verification result is an invalid result in response to finding a directory path in the sensitive mount directory path same as the loading directory path; and determining that the validity verification result is a valid result in response to not finding a directory path in the sensitive mount directory path same as the loading directory path.

In some embodiments, the creation dependency resource information includes second image information; and when executing the computer program, the processor can perform the following operations: acquiring an image list to be verified from the valid policy file by using the security policy agent component; determining that the validity verification result is a valid result when the second image information does not belong to the to-be-verified image list; generating a password verification request by using the security policy agent component when the second image information belongs to the to-be-verified image list; acquiring image password information of the isolation container according to the password verification request; determining that the validity verification result is a valid result when the image password information is valid password information; and determining that the validity verification result is an invalid result when the image password information is invalid password information.

In some embodiments, when executing the computer program, the processor can perform the following operations: receiving a target policy file and a signature file associated with the target policy file that are transmitted by a container security server; acquiring a target public key; the target public key being a public key of the container security server; decrypting the signature file by using the target public key to obtain a hash value to be verified, acquiring a file hash value corresponding to the target policy file, and verifying the signature file according to the to-be-verified hash value and the file hash value to obtain a signature verification result; and storing the target policy file as the valid policy file when the signature verification result is a verification success result; a signature file with verification success being obtained by the container security server by signing the target policy file by using an owned private key.

In some embodiments, when executing the computer program, the processor can perform the following operations: monitoring an update status of the target policy file by the container security server; and acquiring, in response to monitoring that the updated status of the target policy file is a modified state, a modified target policy file from the container security server, and updating the valid policy file according to the modified target policy file.

In some embodiments, the target policy file is generated by the container security server according to at least one of invalid user information, an invalid image list, invalid privileged field information, a sensitive mount directory path, or an image list to be verified; and the invalid image list is acquired by the container security server from an image warehouse management system.

In some embodiments, when executing the computer program, the processor can perform the following operations: processing the isolation container according to an invalid processing mechanism when the validity verification result is an invalid result.

In some embodiments, when executing the computer program, the processor can perform the following operations: creating the isolation container and transmitting alarm information to the container security server when the invalid result is a first invalid result, so that the container security server updates the target policy file according to a running status of the isolation container and the alarm information; and blocking creation of the isolation container when the invalid result is a second invalid result.

In addition, the description of beneficial effects of the same method are not described herein again. For technical details that are not disclosed in the computer storage medium embodiments of the present disclosure, refer to the descriptions of the method embodiments of the present disclosure.

The foregoing computer readable storage medium may be the data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

In some embodiments, a computer program product or a computer program is provided. The computer program product or the computer program includes computer instructions, and the computer instructions are stored in a computer readable storage medium. A processor of a computer device reads the computer instructions from the computer readable storage medium, and the processor executes the computer instructions, so that the computer device performs the data processing method based on a container engine provided in each of the foregoing embodiments.

What is disclosed above is merely example embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A data processing method based on a container engine, performed by a computer device and comprising:
generating a container creation process according to a creation request for an isolation container when a container engine daemon obtains the creation request, the container creation process being used for creating the isolation container;
forwarding the creation request from the container engine daemon to a security policy agent component in response to detecting that the container creation process is started;
acquiring, from the creation request by using the security policy agent component, creation dependency resource information of the isolation container;
acquiring a valid policy file of a container engine corresponding to the isolation container by using the security policy agent component;
performing validity verification on the creation dependency resource information based on the valid policy file, to obtain a validity verification result of the isolation container; and
creating the isolation container when the validity verification result is a valid result, wherein the performing the validity verification on the creation dependency resource information based on the valid policy file to obtain the validity verification result comprises:
searching the valid policy file for invalid privileged field information by using the security policy agent component;
searching for target privileged field information in the creation dependency resource information when the invalid privileged field information is first privileged state information; and
determining the validity verification result based on whether the target privileged field information is found in the creation dependency resource information.

2. The method according to claim 1, wherein the generating a container creation process according to the creation request when a container engine daemon obtains the creation request comprises:
acquiring image data of the isolation container by using the container engine daemon when the container engine daemon obtains the creation request; and
generating the container creation process based on the image data and the creation request in the container engine daemon.

3. The method according to claim 1, wherein the forwarding the creation request from the container engine daemon to a security policy agent component in response to detecting that the container creation process is started comprises:

pausing, in response to monitoring by using a hook script associated with the container engine daemon and detecting that the container creation process is started, running of the container creation process by using the hook script, and forwarding the creation request from the container engine daemon to the security policy agent component by using the hook script.

4. The method according to claim 1, wherein the forwarding the creation request from the container engine daemon to a security policy agent component in response to detecting that the container creation process is started comprises:
pausing, in response to monitoring by using a kernel hook script associated with the security policy agent component and detecting that the container creation process is started, running of the container creation process by using the kernel hook script, and acquiring the creation request from the container engine daemon by using the kernel hook script in the security policy agent component.

5. The method according to claim 1, wherein the forwarding the creation request from the container engine daemon to a security policy agent component in response to detecting that the container creation process is started comprises:
pausing, in response to monitoring by using a hook plugin associated with the container engine daemon and detecting that the container creation process is started, running of the container creation process by using the hook plugin, and transmitting the creation request to the security policy agent component by using an internal server in the hook plugin.

6. The method according to claim 1, wherein the creation dependency resource information comprises user information; and
the performing validity verification on the creation dependency resource information according to the valid policy file to obtain the validity verification result comprises:
acquiring an invalid user information list from the valid policy file by using the security policy agent component;
determining that the validity verification result is an invalid result in response to finding invalid user information in the invalid user information list same as the user information comprised in the creation dependency resource information; and
determining that the validity verification result is a valid result in response to not finding invalid user information in the invalid user information list same as the user information comprised in the creation dependency resource information.

7. The method according to claim 1, wherein the creation dependency resource information comprises first image information; and
the performing validity verification on the creation dependency resource information according to the valid policy file to obtain the validity verification result comprises:
acquiring an invalid image list from the valid policy file by using the security policy agent component;
determining that the validity verification result is an invalid result in response to finding image information in the invalid image list same as the first image information; and
determining that the validity verification result is a valid result in response to not finding image information in the invalid image list same as the first image information.

8. The method according to claim 1, wherein the creation dependency resource information comprises a loading directory path; and
the performing validity verification on the creation dependency resource information according to the valid policy file to obtain the validity verification result comprises:
acquiring a sensitive mount directory path from the valid policy file by using the security policy agent component;
determining that the validity verification result is an invalid result in response to finding a directory path in the sensitive mount directory path same as the loading directory path; and
determining that the validity verification result is a valid result in response to not finding a directory path in the sensitive mount directory path same as the loading directory path.

9. The method according to claim 1, wherein the creation dependency resource information comprises second image information; and
the performing validity verification on the creation dependency resource information according to the valid policy file to obtain the validity verification result comprises:
acquiring an image list to be verified from the valid policy file by using the security policy agent component;
determining that the validity verification result is a valid result when the second image information does not belong to the image list;
generating a password verification request by using the security policy agent component when the second image information belongs to the image list; acquiring image password information of the isolation container according to the password verification request; determining that the validity verification result is a valid result when the image password information is valid password information; and determining that the validity verification result is an invalid result when the image password information is invalid password information.

10. The method according to claim 1, wherein the method further comprises:
receiving a target policy file and a signature file associated with the target policy file that are transmitted by a container security server;
acquiring a target public key, the target public key being a public key of the container security server;
decrypting the signature file by using the target public key to obtain a hash value to be verified, acquiring a file hash value corresponding to the target policy file, and verifying the signature file according to the hash value and the file hash value to obtain a signature verification result; and
storing the target policy file as the valid policy file when the signature verification result is a verification success result, a signature file with verification success being obtained by the container security server by signing the target policy file by using an owned private key.

11. The method according to claim 10, wherein the method further comprises:
monitoring an update status of the target policy file by the container security server; and
acquiring, in response to monitoring that the updated status of the target policy file is a modified state, a modified target policy file from the container security server, and updating the valid policy file according to the modified target policy file.

12. The method according to claim 10, wherein the target policy file is generated by the container security server according to at least one of invalid user information, an invalid image list, invalid privileged field information, a sensitive mount directory path, or an image list to be verified; and the invalid image list is acquired by the container security server from an image warehouse management system.

13. The method according to claim 1, wherein the method further comprises:
processing the isolation container according to an invalid processing mechanism when the validity verification result is an invalid result.

14. The method according to claim 13, wherein the processing the isolation container according to an invalid processing mechanism when the validity verification result is an invalid result comprises:
creating the isolation container and transmitting alarm information to the container security server when the invalid result is a first invalid result, wherein the container security server updates the target policy file according to a running status of the isolation container and the alarm information; and
blocking creation of the isolation container when the invalid result is a second invalid result.

15. The data processing method according to claim 1, wherein the performing the validity verification on the creation dependency resource information based on the valid policy file to obtain the validity verification result further comprises:
determining that the validity verification result is a valid result in response to the target privileged field information being not found in the creation dependency resource information;
acquiring privileged state information corresponding to the target privileged field information in response to the target privileged field information being found in the creation dependency resource information; determining that the validity verification result is an invalid result when the privileged state information is effective state information; and determining that the validity verification result is a valid result when the privileged state information is ineffective state information.

16. A data processing apparatus based on a container engine, comprising: a processor, a memory, and a network interface;
the processor being connected to the memory and the network interface, the network interface being configured to provide a network communication function, the memory being configured to store program code, and the processor being configured to invoke the program code to perform:
generating a container creation process according to a creation request for an isolation container when a container engine daemon obtains the creation request, the container creation process being used for creating the isolation container;
forwarding the creation request from the container engine daemon to a security policy agent component in response to detecting that the container creation process is started;

acquiring, from the creation request by using the security policy agent component, creation dependency resource information of the isolation container;
acquiring a valid policy file of a container engine corresponding to the isolation container by using the security policy agent component;
performing validity verification on the creation dependency resource information based on the valid policy file, to obtain a validity verification result of the isolation container; and
creating the isolation container when the validity verification result is a valid result,
wherein the performing the validity verification on the creation dependency resource information based on the valid policy file to obtain the validity verification result comprises:
searching the valid policy file for invalid privileged field information by using the security policy agent component;
searching for target privileged field information in the creation dependency resource information when the invalid privileged field information is first privileged state information; and
determining the validity verification result based on whether the target privileged field information is found in the creation dependency resource information.

17. A non-transitory computer readable storage medium, wherein the computer readable storage medium stores a computer program, and the computer program is adapted to be loaded by a processor to perform:
generating a container creation process according to a creation request for an isolation container when a container engine daemon obtains the creation request, the container creation process being used for creating the isolation container;
forwarding the creation request from the container engine daemon to a security policy agent component in response to detecting that the container creation process is started;
acquiring, from the creation request by using the security policy agent component, creation dependency resource information of the isolation container;
acquiring a valid policy file of a container engine corresponding to the isolation container by using the security policy agent component;
performing validity verification on the creation dependency resource information based on the valid policy file, to obtain a validity verification result of the isolation container; and
creating the isolation container when the validity verification result is a valid result, wherein the performing the validity verification on the creation dependency resource information based on the valid policy file to obtain the validity verification result comprises:
searching the valid policy file for invalid privileged field information by using the security policy agent component;
searching for target privileged field information in the creation dependency resource information when the invalid privileged field information is first privileged state information; and
determining the validity verification result based on whether the target privileged field information is found in the creation dependency resource information.

* * * * *